US012607904B2

(12) United States Patent
Sugawara et al.

(10) Patent No.: US 12,607,904 B2
(45) Date of Patent: Apr. 21, 2026

(54) ACTUATOR WITH EMBEDDED WIRE

(71) Applicants: Masayoshi Sugawara, Tokyo (JP);
Tomoyuki Murakami, Tokyo (JP)

(72) Inventors: Masayoshi Sugawara, Tokyo (JP);
Tomoyuki Murakami, Tokyo (JP)

(73) Assignee: MITSUMI ELECTRIC CO., LTD.,
Tokyo (JP)

( * ) Notice: Subject to any disclaimer, the term of this
patent is extended or adjusted under 35
U.S.C. 154(b) by 95 days.

(21) Appl. No.: 18/699,916

(22) PCT Filed: Oct. 4, 2022

(86) PCT No.: PCT/JP2022/037043
§ 371 (c)(1),
(2) Date: Apr. 10, 2024

(87) PCT Pub. No.: WO2023/063157
PCT Pub. Date: Apr. 20, 2023

(65) Prior Publication Data
US 2025/0013125 A1      Jan. 9, 2025

(30) Foreign Application Priority Data

Oct. 12, 2021      (JP) ................................. 2021-167343

(51) Int. Cl.
*G03B 13/36*       (2021.01)
*G02B 27/64*       (2006.01)
(Continued)

(52) U.S. Cl.
CPC ........... *G03B 13/36* (2013.01); *G02B 27/646*
(2013.01); *G03B 5/00* (2013.01); *G03B 30/00*
(2021.01);
(Continued)

(58) Field of Classification Search
CPC .......... G03B 13/36; G03B 5/00; G03B 30/00;
G03B 2205/0023; G03B 2205/0084;
(Continued)

(56) References Cited

U.S. PATENT DOCUMENTS

2018/0364446 A1 * 12/2018 Osaka ...................... G02B 7/08
2020/0174219 A1 * 6/2020 Sugawara .............. H04N 23/67
(Continued)

FOREIGN PATENT DOCUMENTS

JP      2013-231923 A    11/2013
JP      2018-072732 A     5/2018
(Continued)

OTHER PUBLICATIONS

Notice of the Reasons for Rejection for Japanese Patent Application
No. 2021167343, dated Aug. 26, 2025.
(Continued)

*Primary Examiner* — Padma Haliyur
(74) *Attorney, Agent, or Firm* — Shih IP Law Group,
PLLC.

(57) ABSTRACT

This optical element driving device comprises: a movable
side member that moves in a direction orthogonal to an
optical axis by driving of a driving part while holding an
optical element; a fixed side member that is disposed at a
position separate from the movable side member in an
optical axis direction, and supports the movable side mem-
ber movably in the direction orthogonal to the optical axis
via a rolling member; and a wire that is buried in the
movable side member and/or the fixed side member and
electrically connected to the driving part. The movable side
member and the fixed side member each have a housing part
forming surface that forms a housing part of the rolling
(Continued)

member, and are exposed in a portion of the housing part forming surface such that the wire comes into contact with the rolling member.

4 Claims, 19 Drawing Sheets

(51) Int. Cl.
    *G03B 5/00* (2021.01)
    *G03B 30/00* (2021.01)
(52) U.S. Cl.
    CPC ................. *G03B 2205/0023* (2013.01); *G03B 2205/0084* (2013.01)
(58) Field of Classification Search
    CPC .......... G03B 3/10; G03B 15/00; G03B 17/02; G03B 5/06; G03B 2205/0069; G02B 27/646; H04N 23/55; H04N 23/57
    See application file for complete search history.

(56) References Cited

U.S. PATENT DOCUMENTS

| | | | |
|---|---|---|---|
| 2021/0173175 A1 * | 6/2021 | Itagaki | ................. G02B 27/646 |
| 2022/0236516 A1 | 7/2022 | Suzuki | |
| 2023/0408840 A1 * | 12/2023 | Osaka | ................... G02B 27/646 |
| 2023/0408890 A1 * | 12/2023 | Osaka | .................... G03B 13/36 |

FOREIGN PATENT DOCUMENTS

| | | | | |
|---|---|---|---|---|
| JP | 2019-049670 A | 3/2019 | | |
| JP | 2019-053271 A | 4/2019 | | |
| JP | 2019-158906 A | 9/2019 | | |
| JP | 2020-027960 A | 2/2020 | | |
| KR | 10-2013-0141888 A | 12/2013 | | |
| WO | WO-2020036157 A1 * | 2/2020 | .......... G02B 27/646 |
| WO | 2020230703 A1 | 11/2020 | | |
| WO | WO-2020246465 A1 * | 12/2020 | ............. H04N 23/57 |

OTHER PUBLICATIONS

International Search Report of PCT/JP2022/037043 dated Nov. 29, 2022.
Decision of Rejection together with its machine translation dated Nov. 25, 2025 for the corresponding Japanese Patent Application No. 2021-167343.

* cited by examiner

M

M

ACTUATOR WITH EMBEDDED WIRE

TECHNICAL FIELD

The present invention relates to an optical element driving device, a camera module, and a camera-mounted device.

BACKGROUND ART

In general, a small-sized camera module is mounted in a mobile terminal such as a smartphone. In such a camera module, an optical element driving device that drives an optical element is used.

The optical element driving device has an auto-focusing function (hereinafter referred to as "AF (Auto Focus) function") and a shake-correcting function (hereinafter referred to as "OIS (Optical Image Stabilization) function") (for example, Patent Literature (hereinafter referred to as "PTL") 1). The optical element driving device uses the AF function to automatically perform focusing when a subject is photographed, and uses the OIS function to reduce irregularities of an image by optically correcting shake (vibration) generated at the time of photographing.

The optical element driving device as described above includes: an AF supporting part that movably supports a lens part in a direction of an optical axis (hereinafter, which may also be referred to as "optical axis direction"); and an OIS supporting part that supports the lens part in a swayable manner within a plane orthogonal to the optical axis direction. For example, the OIS supporting part in PTL 1 includes: a frame; a guide groove portion formed in the frame; and a ball member that is movably disposed on the inner side of the guide groove portion and supports a lens part in a swayable manner with respect to the frame.

CITATION LIST

Patent Literature

PTL 1
Japanese Patent Application Laid-Open No. 2019-53271

SUMMARY OF INVENTION

Technical Problem

In the optical element driving device as indicated in PTL 1, the frame in which the guide groove portion is formed is generally formed of a resin material or the like. The ball member disposed on the inner side of the guide groove portion is, on the other hand, generally formed of a material harder than the resin material, for example, a ceramic material or the like. Thus, there is a difference in hardness between the material forming the guide groove portion and the material forming the ball member. For this reason, for example, when the optical element driving device is subjected to a huge impact by a fall or the like, the guide groove portion may be deformed by generation of a dent due to the ball member in the guide groove portion, or the like. The deformed guide groove portion may affect the movement of the ball member disposed on the inner side of the guide groove portion to prevent the lens part from swaying appropriately and to make it impossible to perform the shake correction described above appropriately.

An object of the present invention is to provide an optical element driving device, a camera module, and a camera-mounted device each capable of suppressing deformation of a supporting part due to an impact.

Solution to Problem

An optical element driving device according to the present invention includes: a movable-side member that moves, in a state of holding an optical element, in directions orthogonal to an optical axis by driving of a driving part; a fixing-side member that is disposed in a position away from the movable-side member in a direction of the optical axis and movably supports the movable-side member in the directions orthogonal to the optical axis via a rolling member; and an interconnection that is embedded in at least one of the movable-side member and the fixing-side member and is electrically connected to the driving part. The movable-side member and the fixing-side member include a housing part-forming surface that forms a housing part of the rolling member, and the interconnection is exposed at a portion of the housing part-forming surface so as to come into contact with the rolling member.

An optical element driving device according to the present invention includes: a first movable part that is movable, in a state of holding an optical element, in a first direction of directions orthogonal to an optical axis; a second movable part that is disposed in a position away from the first movable part in a direction of the optical axis, movably supports the first movable part in the first direction via a rolling member, and is movable together with the first movable part in a second direction of the directions orthogonal to the optical axis, where the second direction is orthogonal to the first direction; a fixing part that is disposed in a position away from the second movable part in the direction of the optical axis and movably supports the second movable part in the second direction via the rolling member; a driving part that drives the first movable part in the first direction with respect to the second movable part and drives the second movable part in the second direction with respect to the fixing part; and an interconnection that is embedded in each of the first movable part and the fixing part and is electrically connected to the driving part. Each of the first movable part, the second movable part, and the fixing part includes a housing part-forming surface that forms a housing part of the rolling member, and the interconnection is exposed at a portion of the housing part-forming surface so as to come into contact with the rolling member.

A camera module according to the present invention includes: the optical element driving device described above; and an image-capturing part that captures a subject image formed by the optical element.

A camera-mounted device according to the present invention is an information device or a transport device. The camera-mounted device includes: the camera module described above; and an image processing part that processes image information obtained by the camera module.

Advantageous Effects of Invention

According to the present invention, it is possible to suppress deformation of a supporting part due to an impact.

DESCRIPTION OF EMBODIMENTS

Hereinafter, an embodiment of the present invention will be described in detail with reference to the accompanying drawings.

Smartphone

Figure 1A:
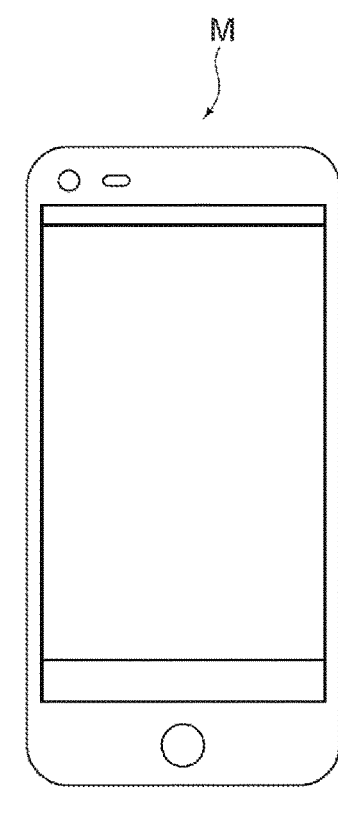
FIG. 1A is a front view of a smartphone in which a camera module according to an embodiment of the present invention is mounted.
Figure 1B:
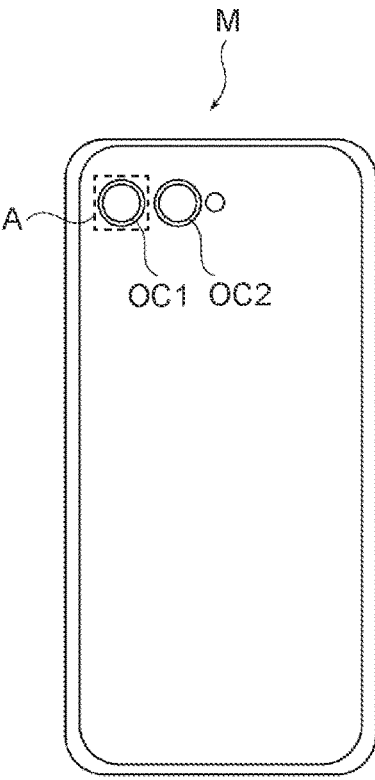
FIG. 1B is a rear view of the smartphone illustrated in FIG. 1A.

FIGS. 1A and 1B illustrate smartphone M (an example of the camera-mounted device) in which camera module A according to the present embodiment is mounted. FIG. 1A is a front view of smartphone M, and FIG. 1B is a rear view of smartphone M.

Smartphone M includes a dual camera a dual camera formed of two rear surface cameras OC1 and OC2. In the present embodiment, camera module A is applied to rear surface cameras OC1 and OC2.

Camera module A has the AF function and the OIS function, and is capable of photographing an image without image blurring by automatically performing focusing when a subject is photographed and by optically correcting shake (vibration) generated at the time of photographing.

Camera Module

Figure 2:
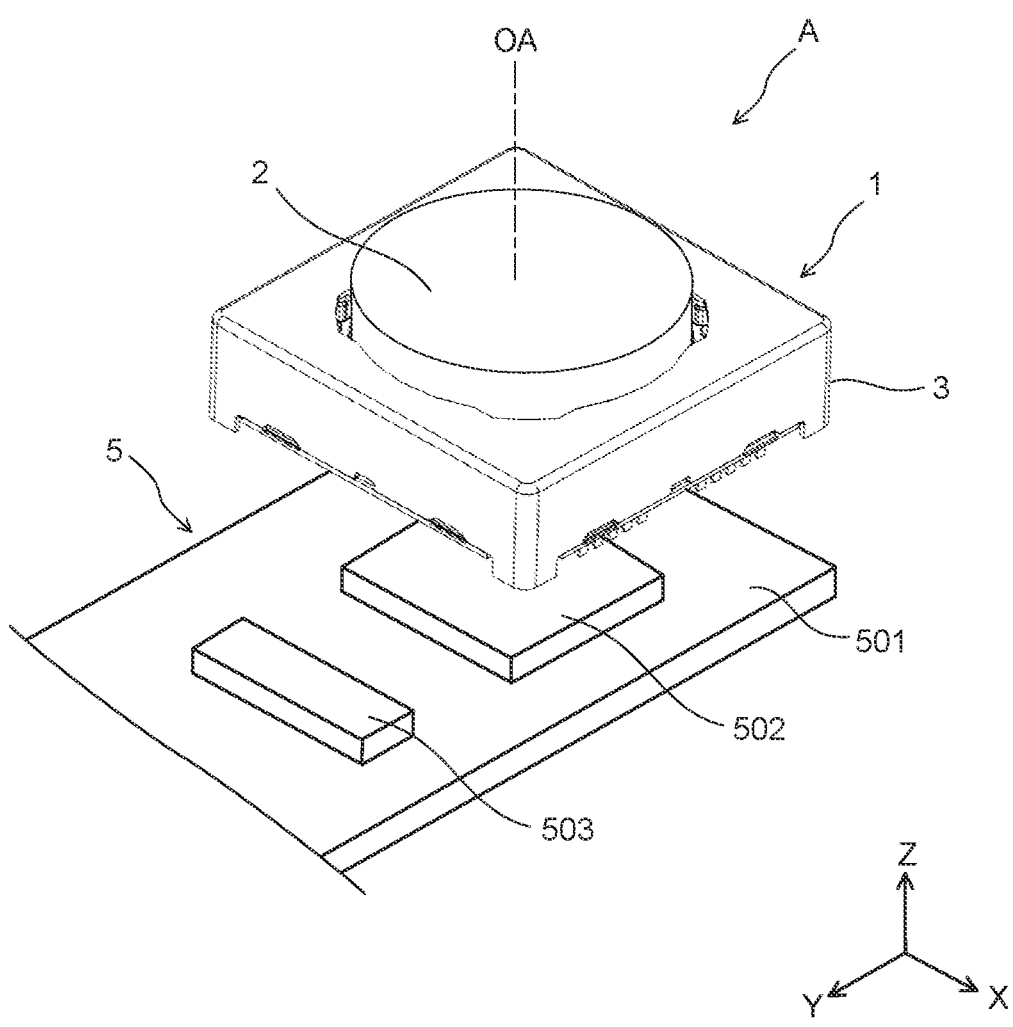
FIG. 2 is a perspective view of the camera module and an image-capturing part.
Figure 3:
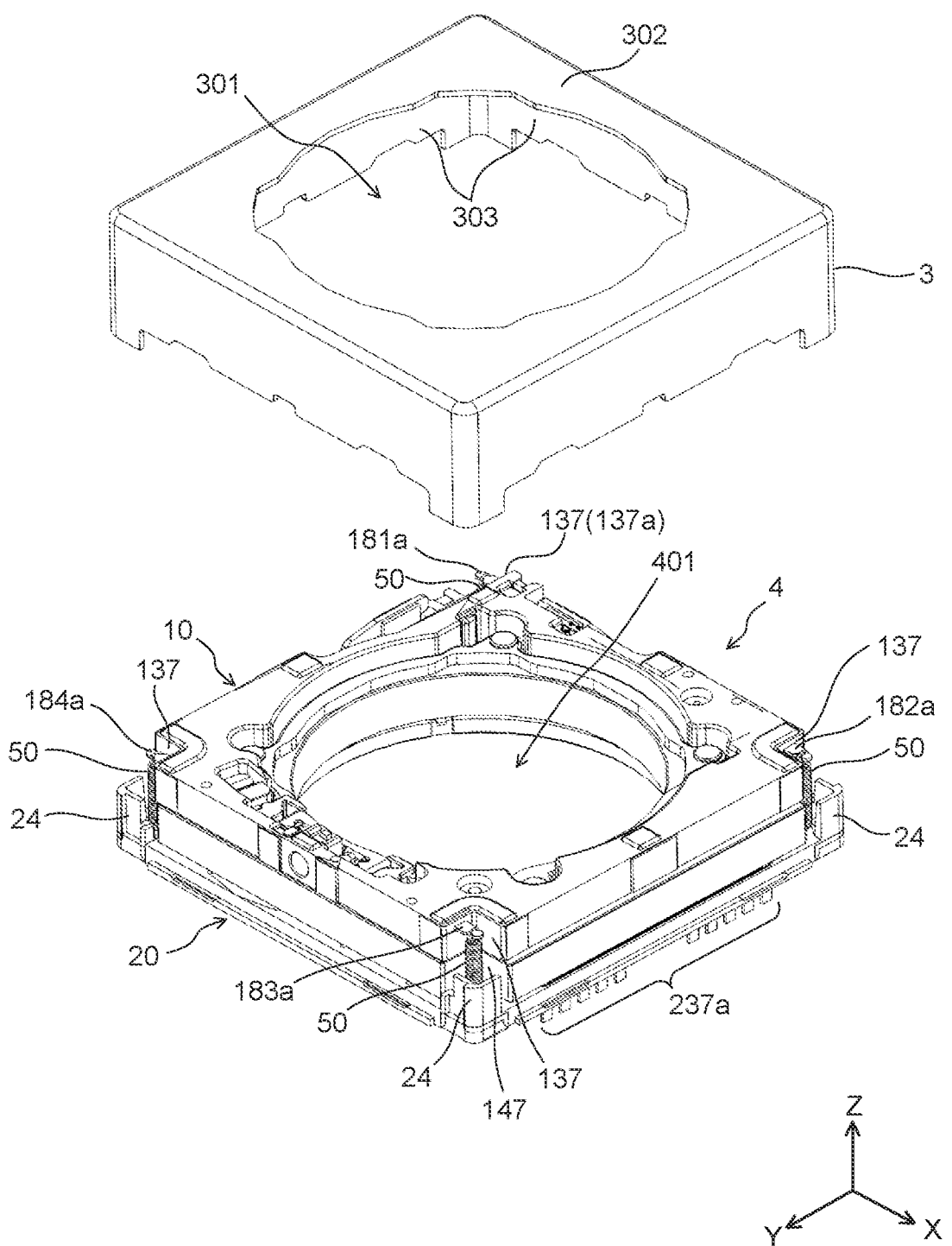
FIG. 3 is an exploded perspective view of an optical element driving device of the camera module illustrated in FIG. 2.

FIG. 2 is a perspective view of camera module A and image-capturing part 5. FIG. 3 is an exploded perspective view of optical element driving device 1 of camera module A illustrated in FIG. 2. Note that, illustration of lens part 2 is omitted in FIG. 3. As illustrated in FIGS. 2 and 3, the present embodiment will be described using an orthogonal coordinate system (X, Y, Z). The same orthogonal coordinate system (X, Y, Z) is also used in the drawings to be described later.

Camera module A is mounted such that the X direction is an up-down direction (or a left-right direction), the Y direction is a left-right direction (or an up-down direction), and the Z direction is a front-rear direction, for example, in a case where photographing is performed with smartphone M. The Z direction is a direction that extends along the direction of optical axis OA of lens part 2 in a case where lens part 2 is assembled to camera module A. That is, the Z direction is an optical axis direction, and in FIGS. 2 and 3, the upper side (+Z side) in the drawings is a light reception side in the optical axis direction, and the lower side (−Z side) in the drawings is an image formation side in the optical axis direction.

Further, hereinafter, the X and Y directions that are orthogonal to the Z axis will be referred to as "optical axis-orthogonal directions" and the XY plane will be referred to as "optical axis-orthogonal plane". Further, the direction extending radially from optical axis OA will be referred to as "radial direction", and the direction extending so as to surround the periphery of optical axis OA will be referred to as "circumferential direction". Note that, the radial and circumferential directions may be regarded as the radial and circumferential directions of opening 301 of cover 3 to be described later and/or opening 401 of optical element driving device body 4 to be described later.

As illustrated in FIG. 2, camera module A includes: optical element driving device 1 that realizes the AF function and the OIS function; lens part 2 including a lens housed in a lens barrel having a cylindrical shape; and image-capturing part 5 that captures a subject image formed by lens part 2, and the like. That is, optical element driving device 1 is a so-called lens driving device that drives lens part 2 as an optical element.

Cover

In optical element driving device 1, the outside of optical element driving device body 4 is covered with cover 3. Cover 3 is a capped square cylindrical body having a rectangular shape in plan view when viewed from the optical axis direction. In the present embodiment, cover 3 has a square shape in plan view. Cover 3 includes opening 301 having a substantially circular shape in the upper surface. Lens part 2 is configured to be housed in opening 401 of optical element driving device body 4, to face the outside through opening 301 of cover 3, and to protrude from opening surface 302 of cover 3 on the light reception side in the optical axis direction, for example, along with movement in the optical axis direction. Inner wall 303 of cover 3 is fixed to base 21 (see FIG. 6) of OIS fixing part 20 of optical element driving device body 4 by, for example, adhesion, and inner wall 303 and base 21 house OIS movable part 10 and the like (see FIG. 3) therein.

Cover 3 includes a member that shields electromagnetic waves from the outside of optical element driving device 1, for example, a shielding member formed of a magnetic material.

Image-Capturing Part

Image-capturing part 5 is disposed on the image formation side of optical element driving device 1 in the optical axis direction. Image-capturing part 5 includes, for example, image sensor board 501, and image-capturing element 502 and control part 503 both of which are mounted in image sensor board 501. Image-capturing element 502 is formed of, for example, a charge-coupled device (CCD) image sensor, a complementary metal oxide semiconductor (CMOS) image sensor, or the like, and captures a subject image formed by lens part 2.

Control part 503 is formed of, for example, a control IC or a driver IC, and performs driving control of optical element driving device 1. Optical element driving device 1 is mounted in image sensor board 501 and is mechanically and electrically connected thereto. Note that, control part 503 may be provided in image sensor board 501 or may be provided in a camera-mounted device (smartphone M in the present embodiment) in which camera module A is mounted.

Optical Element Driving Device Body

Figure 4:
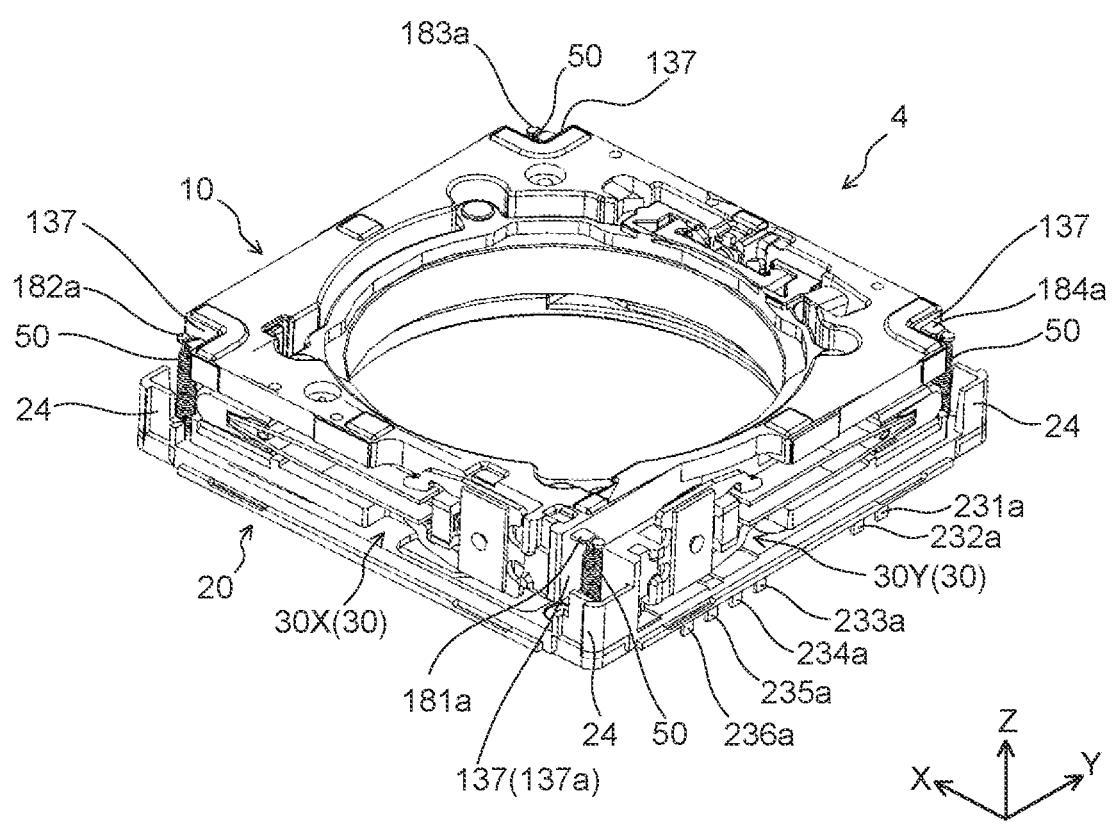
FIG. 4 is a perspective view of an optical element driving device body illustrated in FIG. 3.
Figure 5:
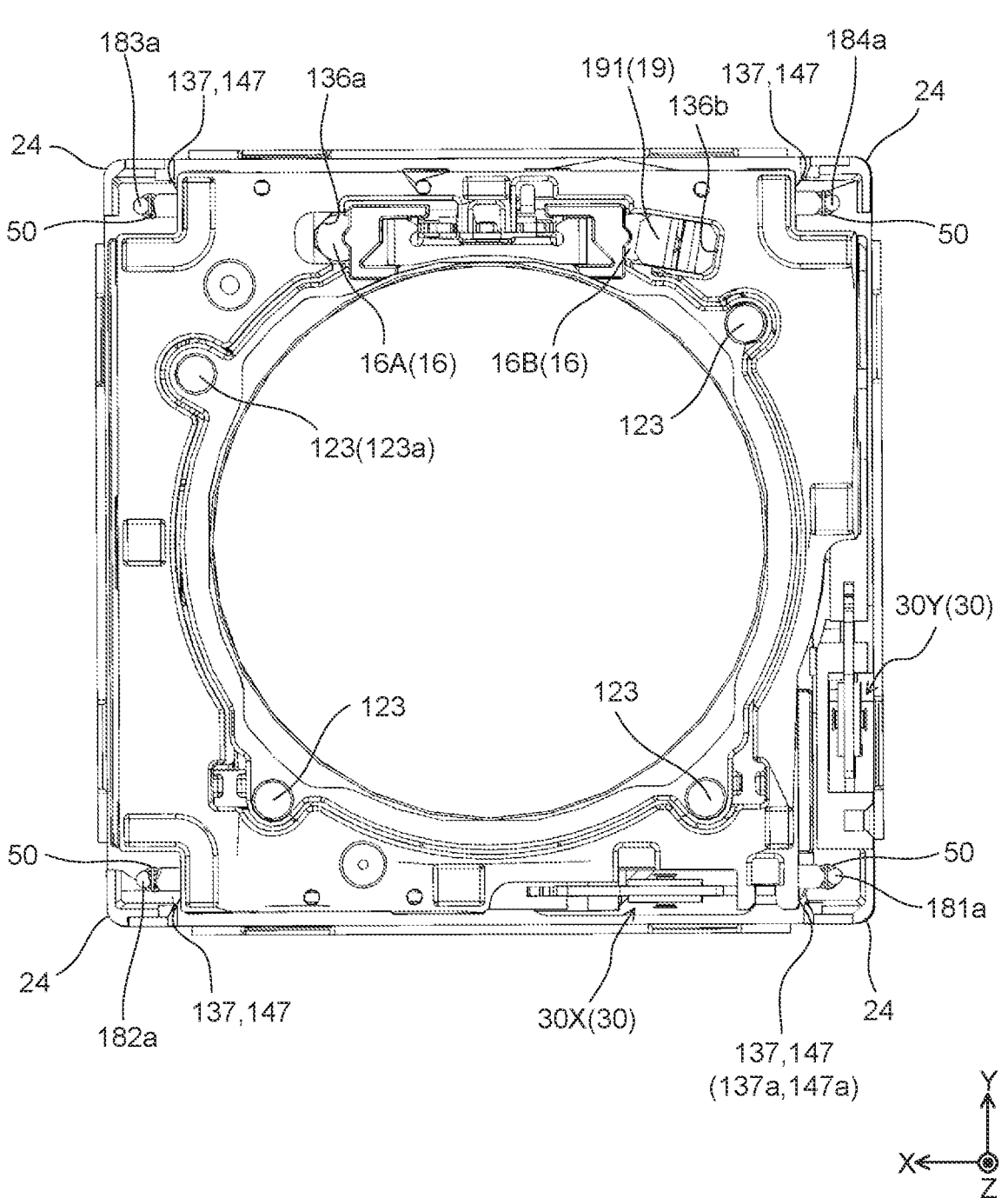
FIG. 5 is a plan view of the optical element driving device body illustrated in FIG. 3.
Figure 6:
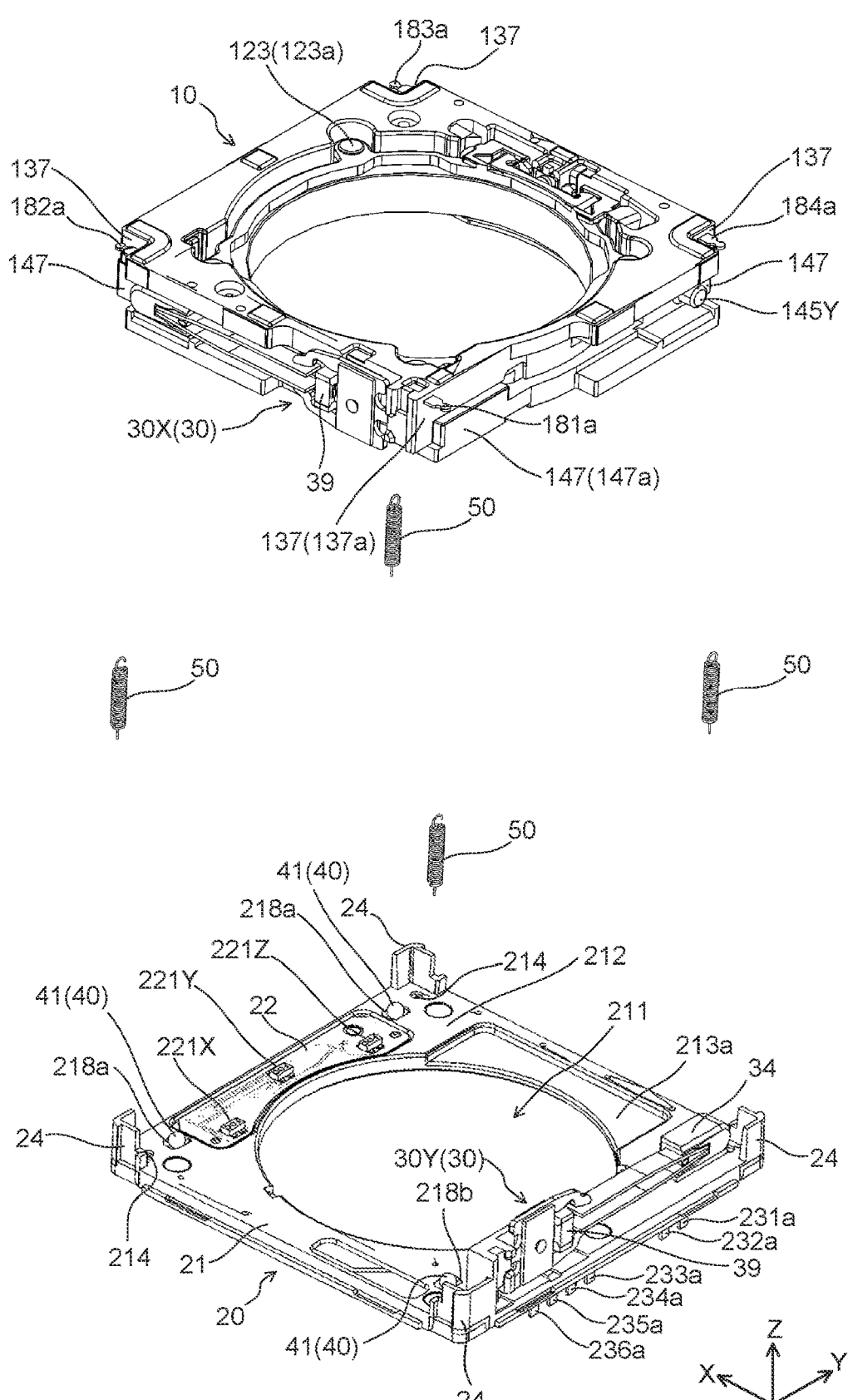
FIG. 6 is an exploded perspective view of the optical element driving device body illustrated in FIG. 3.

FIGS. 4 to 6 illustrate optical element driving device body 4. FIG. 4 is a perspective view of optical element driving device body 4. FIG. 4 is a diagram in which optical element driving device body 4 illustrated in FIG. 3 is rotated 180° around the Z-axis. FIG. 5 is a plan view of optical element driving device body 4. FIG. 6 is an exploded perspective view of optical element driving device body 4.

As illustrated in FIG. 6, optical element driving device body 4 includes OIS movable part 10 (the movable-side member in the present invention), OIS fixing part 20 (the fixing-side member in the present invention), OIS driving part 30, OIS supporting part 40 (the supporting part in the present invention), and OIS biasing members 50.

OIS movable part 10 is a member that moves, in a state of holding lens part 2, in the optical axis-orthogonal directions by driving of OIS driving part 30. For example, OIS movable part 10 sways within the optical axis-orthogonal plane at the time of shake correction. As will be described later in detail, OIS movable part 10 includes AF part 11, second stage 14 (the second movable part in the present invention), and OIS supporting part 40 (X-direction reference balls 42) (see FIG. 12 or the like). In the same manner, as will be described later in detail, AF part 11 includes AF movable part 12, first stage 13 (the first movable part in the present invention), AF driving part 15, and AF supporting part 16 (see FIG. 13 or the like).

OIS fixing part 20 is a member that is disposed in a position away from OIS movable part 10 in the optical axis direction and supports OIS movable part 10 in a swayable manner (movably) in the optical axis-orthogonal directions via OIS supporting part 40 (Y-direction reference balls 41). As illustrated in FIG. 6, OIS fixing part 20 includes base 21, and OIS supporting part 40 (Y-direction reference balls 41). OIS movable part 10 is disposed away from base 21 in the optical axis direction via Y-direction reference balls 41, and base 21 supports OIS movable part 10 in a swayable manner via Y-direction reference balls 41. Details of OIS fixing part 20 will be described later with reference to FIG. 7.

Further, as will be described later in detail, OIS movable part 10 and OIS fixing part 20 are elastically connected by OIS biasing members 50 so as to be biased in a direction approaching each other, in other words, so as to maintain the state of holding OIS supporting part 40 therebetween (see FIG. 6). OIS biasing member 50 described above is formed of a conductive material, and also functions as a connecting member that forms a conductive path between a circuit for driving lens part 2 (interconnections 181 to 184 to be described later) and a circuit on a side of OIS fixing part 20 (interconnections 231 to 234 to be described later). In the present embodiment, OIS biasing members 50 are disposed in portions of the four corners (corner portions) of optical element driving device body 4 in plan view (see FIG. 5).

OIS driving part 30 includes: first OIS driving part 30X that drives OIS movable part 10 in the X direction (the first direction of the optical axis-orthogonal directions); and second OIS driving part 30Y that drives OIS movable part 10 in the Y direction (the second direction of the optical axis-orthogonal directions, which is orthogonal to the X direction).

In the present embodiment, for the movement in the Y direction, OIS movable part 10 in its entirety, including AF part 11, moves as a movable body (movable-side member). That is, for the movement in the Y direction, base 21 of OIS fixing part 20 forms a fixing body (fixing-side member), and Y-direction reference balls 41 (the rolling member in the present invention) function as OIS supporting part 40 that supports OIS movable part 10 in a swayable manner in the Y direction.

For the movement in the X direction, on the other hand, AF part 11 moves as a movable body (movable-side member) as will be described later in detail with reference to FIG. 12. That is, for the movement in the X direction, second stage 14 and base 21 form a fixing body (fixing-side member), and X-direction reference balls 42 (the rolling member in the present invention) function as OIS supporting part 40 that supports AF part 11 in a swayable manner in the X direction.

OIS Fixing Part

Figure 7:
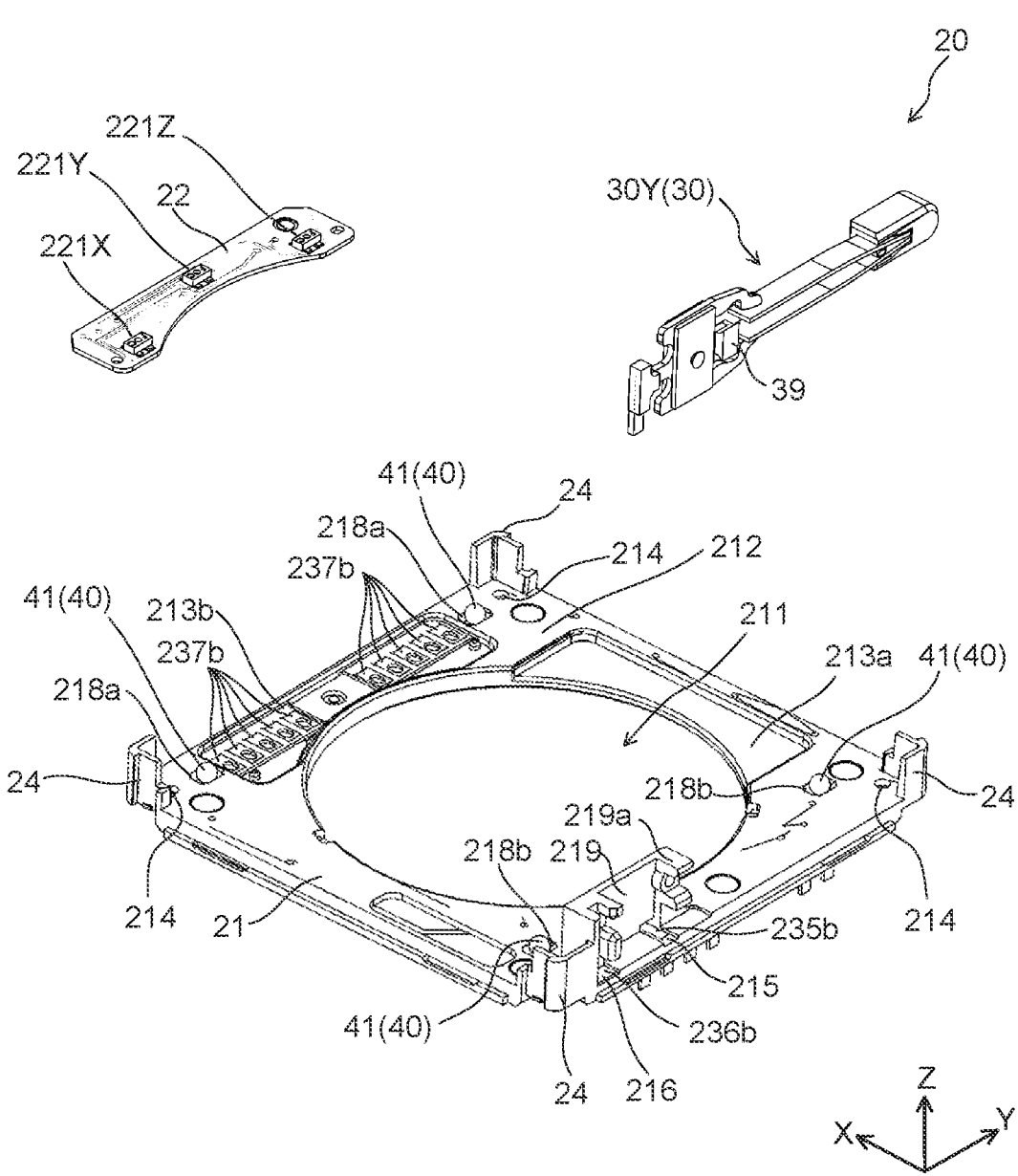
FIG. 7 is an exploded perspective view of an OIS fixing part illustrated in FIG. 6.

FIG. 7 is an exploded perspective view of OIS fixing part 20. OIS fixing part 20 in FIG. 6 is in a state in which second OIS driving part 30Y and sensor board 22 are attached thereto, whereas OIS fixing part 20 in FIG. 7 is in a state in which second OIS driving part 30Y and sensor board 22 are detached therefrom.

OIS fixing part 20 includes base 21, sensor board 22, interconnections 231 to 237 (the interconnection in the present invention), wall portions 24, second OIS driving part 30Y, and Y-direction reference balls 41.

Base

Base 21 is formed of, for example, a molding material made of polyarylate (PAR), a PAR alloy (for example, PAR/PC) that is a mixture of a plurality of resin materials including PAR, or a liquid crystal polymer. Base 21 is a member having a rectangular shape in plan view, and includes opening 211, which has a circular shape, in the center.

Base 21 includes: first base portion 212 that forms a main surface of base 21; and second base portions 213*a* and 213*b* that are formed to be recessed with respect to first base portion 212.

Second base portion 213*a* is provided correspondingly to a portion of OIS movable part 10 where the portion protrudes on the image formation side in the optical axis direction, that is, AF motor fixing part 135 of first stage 13 (see FIGS. 13 and 14 to be described later). Specifically, second base portion 213*a* is formed to be one size larger than AF motor fixing part 135 in plan view such that no interference is generated at the time of shake correction. Terminals 237*b* of a plurality of interconnections 237 are disposed in second base portion 213*b*, and sensor board 22 including magnetic sensors 221X, 221Y, and 221Z is disposed on a plurality of terminals 237*b*.

Second base portions 213*a* and 213*b* are formed to be recessed with respect to first base portion 212 in the above-described manner, which therefore makes it possible to ensure a movement stroke of AF movable part 12 to be described later and to achieve a reduction in the height of optical element driving device 1.

Further, base 21 includes OIS motor fixing part 219 in which second OIS driving part 30Y is disposed. OIS motor fixing part 219 is, for example, provided in the vicinity of one corner portion of base 21, is formed to protrude from first base portion 212 toward the light reception side in the optical axis direction, and has a shape allowing second OIS driving part 30Y to be held.

Interconnection in Base

Figure 8:
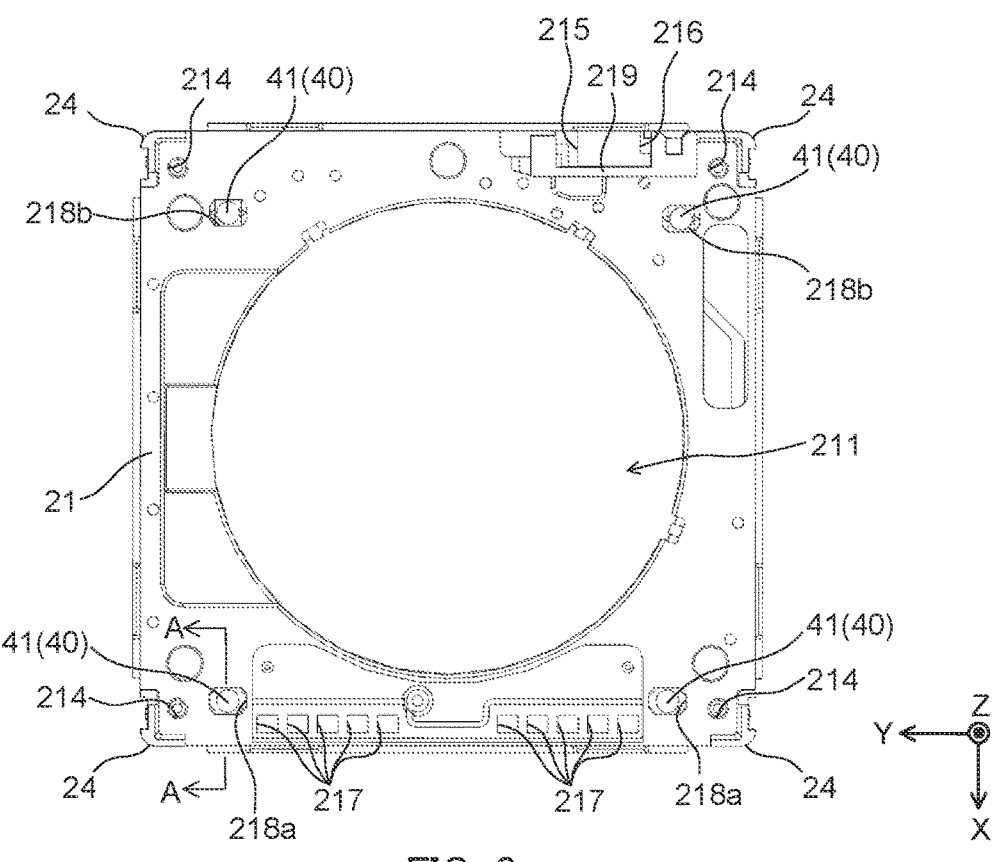
FIG. 8 is a plan view of a base of the OIS fixing part illustrated in FIG. 7.
Figure 9:
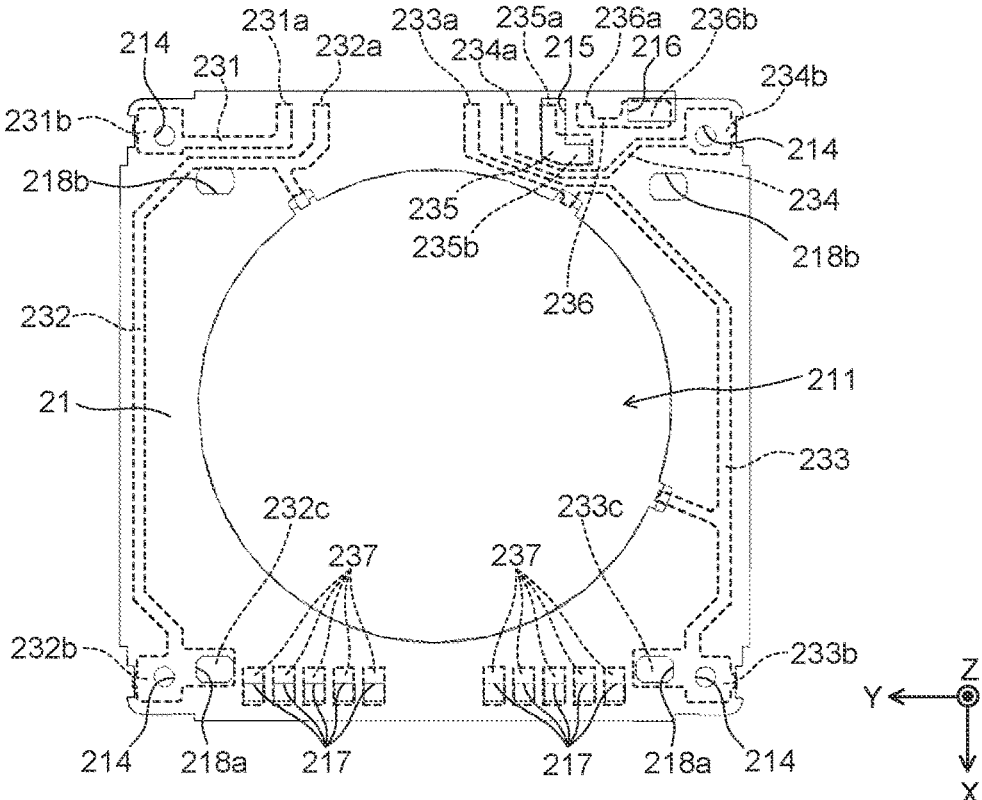
FIG. 9 illustrates a positional relationship in the base illustrated in FIG. 8 among opening portions formed in a front surface of the base and interconnections disposed inside the base.

FIG. 8 is a plan view of base 21 of OIS fixing part 20. FIG. 9 illustrates a positional relationship in base 21 among opening portions formed in a front surface of base 21 and interconnections 231 to 237 disposed inside base 21. In order to illustrate the positional relationship among base 21, opening portions 214 to 217, Y-direction opening portions 218*a* and 218*b*, and interconnections 231 to 237, FIG. 9 illustrates only the shapes thereof.

Interconnections 231 to 237 are embedded in base 21, for example, by insert molding. Interconnections 231 to 237 are embedded such that the surfaces thereof on a side of the front surface (on the light reception side in the optical axis direction) of base 21 are parallel to the front surface of base 21.

Interconnections 231 to 237 are disposed inside base 21, and are extended from the positions of terminals 231*a* to 237*a* of one end portions of interconnections 231 to 237 to the positions of terminals 231*b* to 237*b* of the other end portions thereof, respectively (see FIG. 9). Terminals 231*a* to 237*a* are exposed from a bottom surface of base 21 (see FIGS. 3 and 4). Further, as will be described later in detail, terminals 231*b* to 237*b* are exposed on the side of the front surface (on the light reception side in the optical axis direction) of base 21 (see FIGS. 8 and 9).

Interconnections 231 to 234 are interconnections that serve as power supply lines for AF driving part 15 and first OIS driving part 30X. Terminals 231*a* to 234*a* of interconnections 231 to 234 are exposed from the bottom surface of base 21 (see FIG. 4), and terminals 231*b* to 234*b* thereof are exposed from opening portions 214 formed at four corners on the side of the front surface (the light reception side in the optical axis direction) of base 21 (see FIG. 9). Terminals 231*b* to 234*b* are electrically connected to OIS biasing members 50, and power is supplied to AF driving part 15 and first OIS driving part 30X via OIS biasing members 50.

Interconnections 235 and 236 are interconnections that serve as power supply lines for second OIS driving part 30Y. Terminals 235*a* and 236*a* of interconnections 235 and 236 are exposed from the bottom surface of base 21 (see FIG. 4), and terminals 235*b* are 236*b* thereof are exposed from opening portions 215 and 216 formed in the vicinity of OIS motor fixing part 219 on the side of the front surface of base 21 (see FIG. 9). Terminals 235*b* and 236*b* are electrically connected to second OIS driving part 30Y, and power is supplied to second OIS driving part 30Y.

Interconnections 237 are interconnections that serve as power supply lines (for example, four power supply lines) and signal lines (for example, six signal lines) for magnetic sensors 221X, 221Y, and 221Z of sensor board 22. Terminals 237*a* of interconnections 237 are exposed from the bottom surface of base 21 (see FIG. 3), and terminals 237*b* thereof are exposed from opening portions 217 formed on the side of the front surface of base 21 (see FIG. 9). Terminals 237*b* are electrically connected to sensor board 22, and power is supplied to sensor board 22 as well as transmission and reception of signals to and from sensor board 22 are performed.

Interconnections 232 and 233 among interconnections 231 to 237 disposed inside base 21 include extension portions 232*c* and 233*c*, respectively, that are extended so as to be exposed within Y-direction opening portions 218*a*. Extension portions 232*c* and 233*c* are extended from portions of interconnections 232 and 233, where the portions are close to Y-direction opening portions 218*a*. Y-direction opening portions 218*a* in which interconnections 232 and 233 (extension portions 232*c* and 233*c*) are exposed will be described later with reference to FIG. 10.

Although it is configured here as an example such that portions (extension portions 232*c* and 233*c*) of interconnections are exposed within Y-direction opening portions 218*a*, the present invention is not limited thereto, and it may be configured such that portions of interconnections are exposed within all Y-direction opening portions 218*a* and 218*b*. For example, an arbitrary plurality of interconnections among interconnections 231 to 237 may be provided with extension portions similar to extension portions 232*c* and 233*c* described above, or the disposition of interconnections 231 to 237 may be adjusted.

OIS Supporting Part-Y Direction

Figure 10:
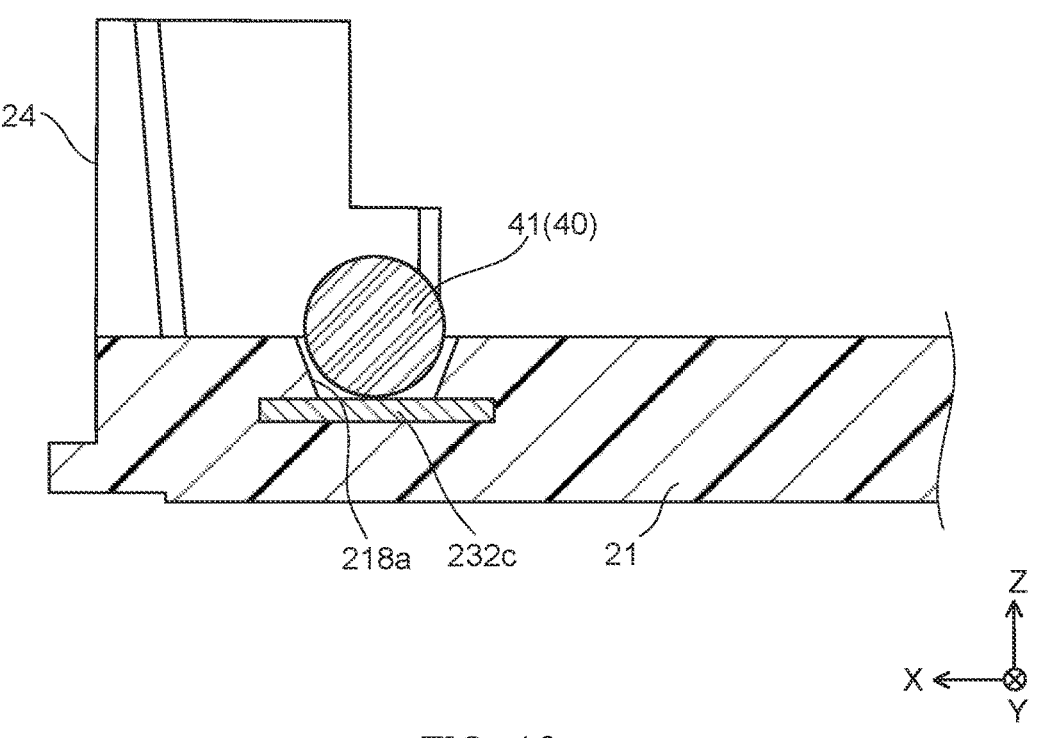
FIG. 10 is a cross-sectional view of the base illustrated in FIG. 8 taken along line A-A.

FIG. 10 is a cross-sectional view of base 21 illustrated in FIG. 8 taken along line A-A. OIS supporting part 40 will be described with reference to FIGS. 8 and 9 as well as FIG. 10.

Base 21 includes Y-direction opening portions 218*a* and 218*b* (the housing part in the present invention) that house Y-direction reference balls 41 that form OIS supporting part 40 (see FIGS. 8 and 9). Y-direction reference balls 41 are held between Y-direction opening portions 218*a* and 218*b* and Y-direction opening portions 144 (the housing part in the present invention) of second stage 14, where Y-direction opening portions 218a and 218b and Y-direction opening portions 144 face each other in the Z direction (see FIG. 18 to be described later).

Y-direction opening portions 218a and 218b and Y-direction opening portions 144 are groove portions that include an opening having a rectangular shape extending in the Y direction. Y-direction opening portions 218a and 218b and Y-direction opening portions 144 are formed such that the cross-sectional shape in the XZ plane is, for example, a square or an inverted triangle (V-shape). Y-direction opening portions 218a and 218b and Y-direction opening portions 144 may be configured such that the groove width tapers toward the bottom surface of the groove portion, in which case the cross-sectional shape in the XZ plane may be configured to be an inverted trapezoid or an inverted triangle (V-shape).

In the present embodiment, as illustrated in FIG. 10, Y-direction opening portion 218a is formed in an inverted trapezoidal cross-sectional shape, and extension portion 232c of interconnection 232 described above is exposed so as to form a bottom portion of Y-direction opening portion 218a. That is, at the bottom portion that is a portion of a housing part-forming surface (inner wall) that forms Y-direction opening portion 218a, extension portion 232c is exposed so as to come into contact with Y-direction reference ball 41 and receive a load in the optical axis direction. Y-direction opening portion 218a on the lower right side in FIG. 9 also has the same configuration. In this case, extension portion 232c exposed at the bottom portion of the housing part-forming surface that forms Y-direction opening portion 218a has a planar shape orthogonal to the optical axis (the Z direction) and abuts on Y-direction reference ball 41 at one point.

Y-direction reference ball 41 is disposed on the inner side of Y-direction opening portion 218a whose bottom portion is formed of extension portion 232c, and comes into contact with extension portion 232c in the Z direction. Interconnections 231 to 237 are formed of conductive metal and are therefore generally harder than base 21 formed of a resin material or the like. For this reason, for example, even when optical element driving device 1 is subjected to a huge impact by a fall or the like, extension portion 233c is less likely to be deformed by base due to Y-direction reference ball 41, or the like, and it is possible to suppress deformation of Y-direction opening portion 218a.

Further, since extension portion 232c of interconnection 232, which is embedded in base 21, is utilized as a portion of the inner wall of Y-direction opening portion 218a, it is possible to suppress deformation of Y-direction opening portion 218a without newly adding a member that is hardly deformed.

Note that, in the present embodiment, Y-direction opening portions 218b and 144 are formed such that the cross-sectional shape in the XZ plane is a V-shape. Here, Y-direction opening portion 218b is not configured such that a portion of interconnections 231 to 237 is exposed, but may be configured such that a portion of interconnections 231 to 237 is exposed at, for example, at least one side surface of the V-shaped cross section of Y-direction opening portion 218b. In this case, a portion or all of an interconnection, which is exposed at Y-direction opening portion 218b, among interconnections 231 to 237, is embedded such that the surface thereof on the side of the front surface (on the light reception side in the optical axis direction) of base 21 is inclined with respect to the front surface of base 21.

Further, the portion or all of the interconnection, which is exposed at Y-direction opening portion 218b, among interconnections 231 to 237, is formed in a V-shaped cross-sectional shape and is embedded in base 21.

Further, here, second stage 14 includes no interconnection therein, and thus, Y-direction opening portion 144 is not configured such that a portion of an interconnection is exposed. In a case where second stage 14 is configured to include an interconnection(s) therein, Y-direction opening portion 144 may be configured such that a portion of an interconnection is exposed in the same manner as in Y-direction opening portion 218b.

The grooves formed by Y-direction opening portions 218a, 218b, and 144, respectively, are formed to be parallel to the Y direction. For this reason, Y-direction reference balls 41 held between Y-direction opening portions 218a and 218b and Y-direction opening portions 144 are rollable in the Y direction within the grooves. That is, base 21 movably supports OIS movable part 10 (second stage 14) in the Y direction via Y-direction reference balls 41.

Y-direction opening portions 218a and 218b and Y-direction opening portions 144 are disposed in portions of the four corners of base 21 and second stage 14 both of which have a rectangular shape. OIS movable part 10 (second stage 14) is supported by base 21 at four Y-direction reference balls 41, that is, at four points. As described above, Y-direction reference balls 41 are held by multipoint contacts, and therefore stably roll in the Y direction.

Note that, OIS movable part 10 (second stage 14) may be supported by base 21 at least at three or more points. For example, in a case where OIS movable part 10 (second stage 14) is supported by base 21 at three points, Y-direction opening portions 218a and 218b and Y-direction opening portions 144 may be disposed at a total of three locations of two locations on a side of one side of base 21 and second stage 14 and one location on a side of the side facing the one side thereof.

Sensor Board

Sensor board 22 is provided in a region in which AF driving part 15 and OIS driving part 30 (first OIS driving part 30X and second OIS driving part 30Y) are not disposed, that is, in a region corresponding to one side of a rectangle that has a planar shape of base 21. Thus, it is possible to integrate the power supply lines and the signal lines for magnetic sensors 221X, 221Y, and 221Z, and it is possible to simplify the interconnection structure in base 21.

Sensor board 22 includes the interconnections including the power supply lines and the signal lines for magnetic sensors 221X, 221Y, and 221Z (illustration is omitted). Magnetic sensors 221X, 221Y, and 221Z are mounted in sensor board 22. Magnetic sensors 221X, 221Y, and 221Z are formed of, for example, a Hall element, a tunnel magneto resistance (TMR) sensor, or the like, and the interconnections formed in sensor board 22 are electrically connected to terminals 237b, thereby being electrically connected to interconnections 237.

As will be described later in detail with reference to FIG. 18, magnet 17X is disposed in first stage 13, which moves in the X direction, in a position facing magnetic sensor 221X (see FIG. 18). An X-direction position detecting part formed of magnetic sensor 221X and magnet 17X detects the position of first stage 13 in the X direction, that is, the position of OIS movable part 10 in the X direction.

Figure 18:
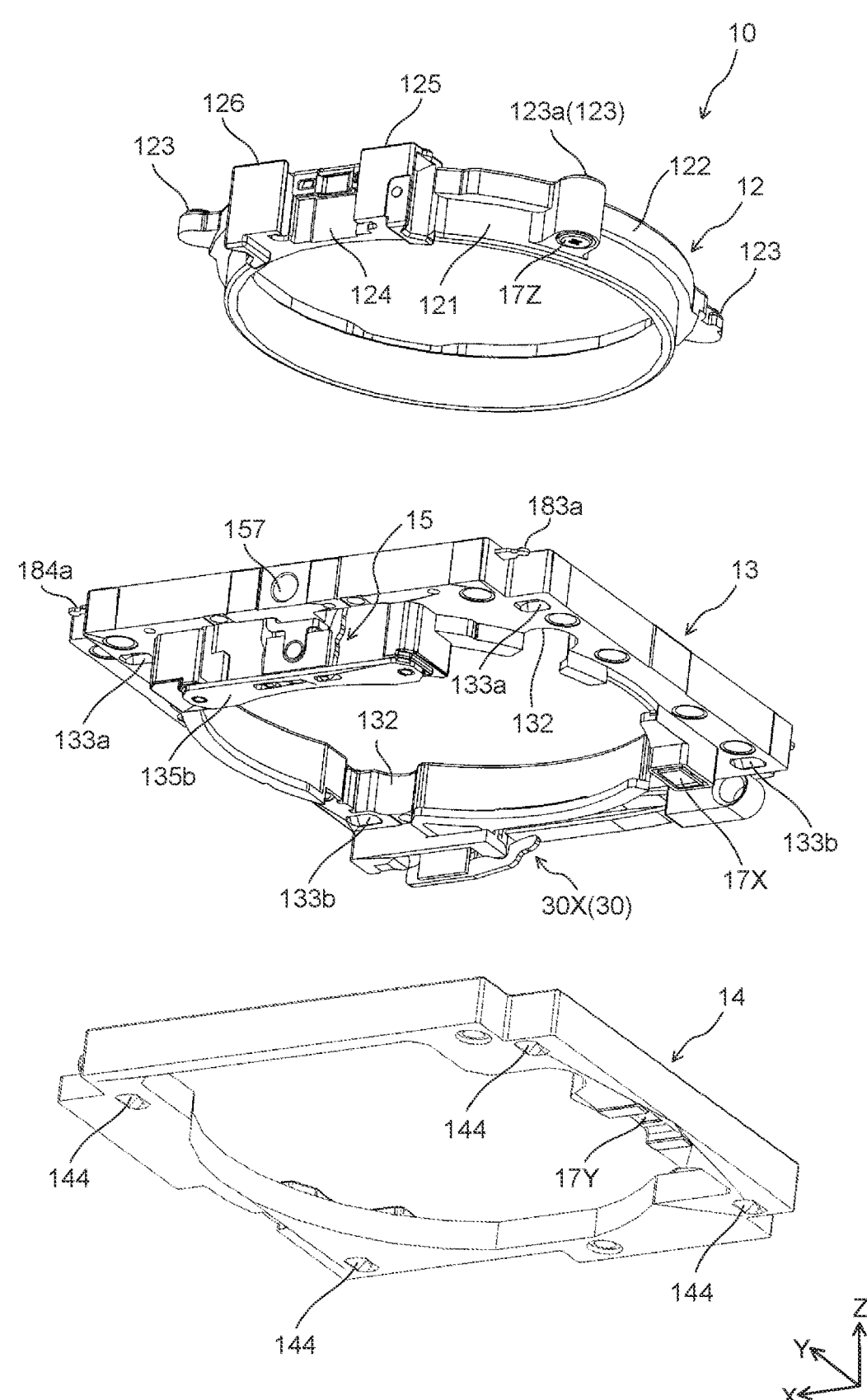
FIG. 18 illustrates the AF movable part, the first stage, and a second stage, which are illustrated in FIG. 6, as viewed from an obliquely-downward side.

Further, magnet 17Y is disposed in second stage 14, which moves in the Y direction, in a position facing magnetic sensor 221Y (see FIG. 18). A Y-direction position detecting part formed of magnetic sensor 221Y and magnet 17Y detects the position of second stage 14 in the Y direction, that is, the position of OIS movable part 10 in the Y direction.

Further, magnet 17Z is disposed in AF movable part 12, which moves in the Z direction, in a position facing magnetic sensor 221Z (see FIG. 18). A Z-direction position detecting part formed of magnetic sensor 221Z and magnet 17Z detects the position of AF movable part 12 in the Z direction.

Note that, in place of magnets 17X, 17Y, and 17Z and magnetic sensors 221X, 221Y, and 221Z, an optical sensor such as a photoreflector may be configured to detect the position of OIS movable part 10 in the X and Y directions and the position of AF movable part 12 in the Z direction.

OIS Driving Part

OIS driving part 30 is an actuator that moves OIS movable part 10 in the X and Y directions. Specifically, OIS driving part 30 includes: first OIS driving part 30X that moves a portion (AF part 11) of OIS movable part 10 in the X direction; and second OIS driving part 30Y that moves OIS movable part 10 in its entirety in the Y direction.

Figure 11:
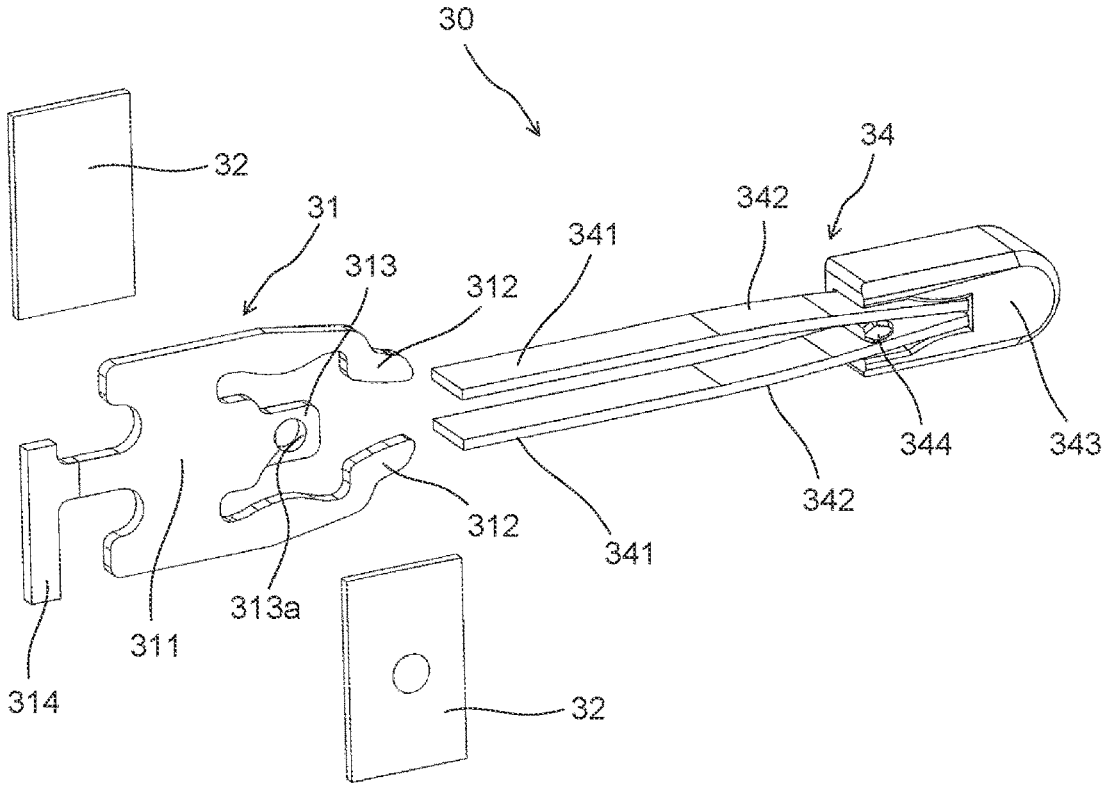
FIG. 11 is an exploded perspective view of an OIS driving part.

OIS driving part 30 will be described with reference to FIG. 7 as well as FIGS. 11 to 14. FIG. 11 is an exploded perspective view of OIS driving part 30. FIG. 12 is an exploded perspective view of OIS movable part 10. FIG. 13 is an exploded perspective view of AF part 11. FIG. 14 is an exploded perspective view of first stage 13.

Note that, FIG. 11 illustrates a state of, as OIS driving part 30, second OIS driving part 30Y whose members are disassembled. First OIS driving part 30X and second OIS driving part 30Y differ in the directions, in which both are disposed, but have the same configuration, and thus, first OIS driving part 30X and second OIS driving part 30Y will be described as OIS driving part 30 in FIG. 11.

First OIS driving part 30X and second OIS driving part 30Y include an ultrasonic motor that serves as a driving source for moving OIS movable part 10. First OIS driving part 30X is fixed to OIS motor fixing part 134 extending along the X direction of first stage 13 (see FIG. 14). Further, second OIS driving part 30Y is fixed to OIS motor fixing part 219 extending along the Y direction of base 21 (see FIG. 7). That is, first OIS driving part 30X and second OIS driving part 30Y are disposed along the sides orthogonal to each other.

As illustrated in FIG. 11, OIS driving part 30 includes OIS resonance portion 31, OIS piezoelectric elements 32, and OIS power transmission part 34. The driving force of OIS driving part 30 is transmitted to other members via OIS power transmission part 34. Specifically, first OIS driving part 30X is connected to second stage 14 via OIS power transmission part 34 of first OIS driving part 30X, and the driving force of first OIS driving part 30X is transmitted to second stage 14. Further, second OIS driving part 30Y is connected to second stage 14 via OIS power transmission part 34 of second OIS driving part 30Y, and the driving force of second OIS driving part 30Y is transmitted to second stage 14. In OIS driving part 30, OIS resonance portion 31 forms an active element, and OIS power transmission part 34 forms a passive element.

OIS resonance portion 31 is formed of a conductive material and resonates with a vibration of OIS piezoelectric elements 32 to be described later to convert the vibrational motion into a linear motion. OIS resonance portion 31 is formed by, for example, laser processing, etching processing, press processing, or the like of a metal plate.

As illustrated in FIG. 11, OIS resonance portion 31 includes trunk portion 311, two arm portions 312, protrusion portion 313, and energization portion 314.

In OIS resonance portion 31, trunk portion 311 is a substantially rectangular portion held between OIS piezoelectric elements 32.

Arm portions 312 extend in the X or Y direction from the upper and lower portions of trunk portion 311. Two arm portions 312 have symmetrical shapes whose free end portions abut on OIS power transmission part 34 and are symmetrically deformed in resonance with the vibration of OIS piezoelectric elements 32.

Protrusion portion 313 extends in the X or Y direction from the central portion of trunk portion 311. In protrusion portion 313, through-hole 313a through which a rivet is inserted is formed.

Figure 14:
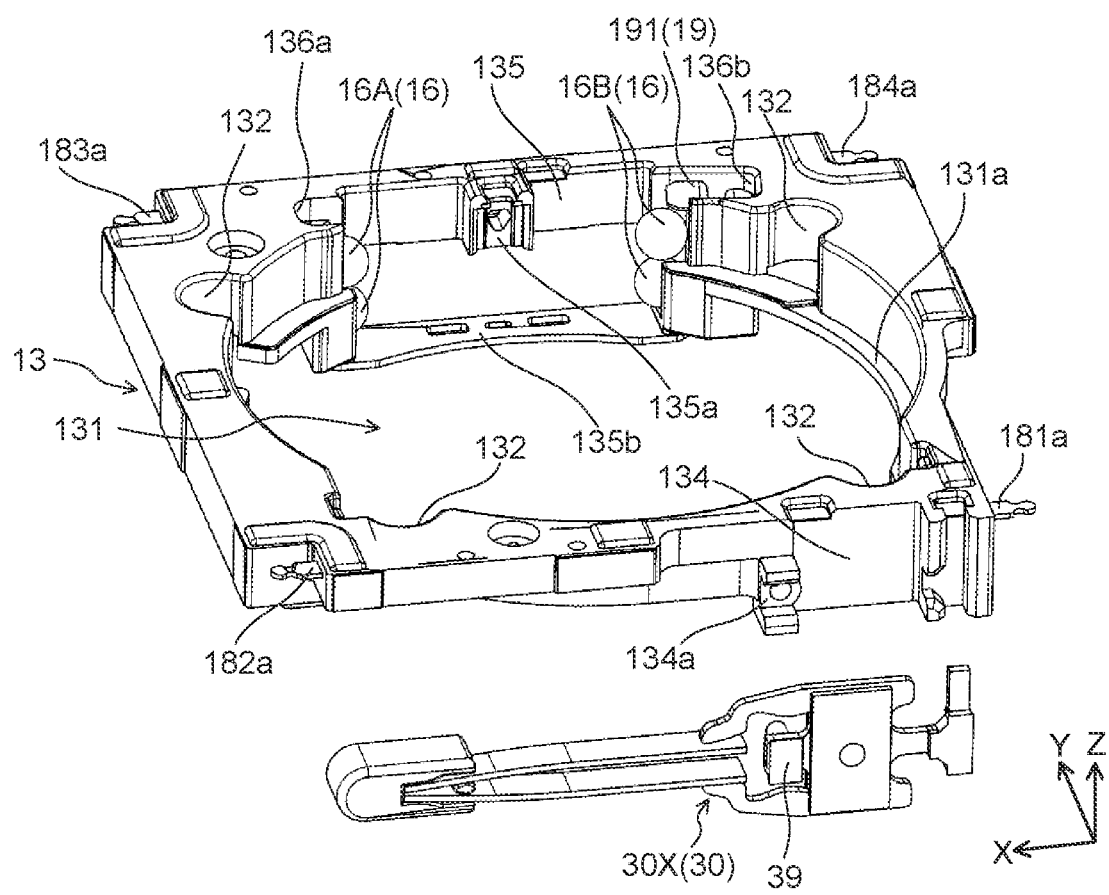
FIG. 14 is an exploded perspective view of a first stage illustrated in FIG. 13.

Here, in OIS motor fixing part 134 of first stage 13, rivet attachment portion 134a including a through-hole through which a rivet (illustration is omitted) is inserted is formed (see FIG. 14). The rivet is inserted through through-hole 313a of protrusion portion 313 and the through-hole of rivet attachment portion 134a from the outer side toward the inner side of optical element driving device body 4 and the leading end thereof is fastened with a fastening tool (illustration is omitted). Note that, the outer side of the rivet is covered with resin member 39. OIS resonance portion 31 of first OIS driving part 30X is fixed to OIS motor fixing part 134 (on a side of first stage 13) by the rivet and the fastening tool.

Further, in OIS motor fixing part 219 of base 21, rivet attachment portion 219a including a through-hole through which a rivet (illustration is omitted) is inserted is formed (see FIG. 7). The rivet is inserted through the through-hole of rivet attachment portion 219a and through-hole 313a of protrusion portion 313 from the inner side toward the outer side of optical element driving device body 4 and the leading end thereof is fastened with a fastening tool (illustration is omitted). Note that, the outer side of the rivet is covered with resin member 39. OIS resonance portion 31 of second OIS driving part 30Y is fixed to OIS motor fixing part 219 (on a side of base 21) by the rivet and the fastening tool.

As described above, the use of the rivets, the fastening tools, and/or the like makes it possible to firmly fix OIS resonance portions 31 of first OIS driving part 30X and second OIS driving part 30Y to OIS motor fixing parts 219 and 134. For this reason, even when a huge impact is applied from outside, OIS resonance portions 31 are not detached or deviated from OIS motor fixing parts 219 and 134, and it is possible to increase the reliability of OIS driving part 30.

Note that, here, OIS resonance portions 31 of first OIS driving part 30X and second OIS driving part 30Y are fixed to OIS motor fixing parts 219 and 134 by using the rivets and the fastening tools, but may be fixed thereto by using other members. For example, OIS resonance portions 31 may be fixed to OIS motor fixing parts 219 and 134 by using a fixing material such as a resin-based adhesive.

Energization portion 314 extends from the central portion of trunk portion 311 on a side opposite to protrusion portion 313. Energization portion 314 of first OIS driving part 30X is electrically connected to terminal 181b of interconnection 181 of first stage 13, for example, by solder (illustration is omitted) (see FIG. 20 to be described later). Further, energization portion 314 of second OIS driving part 30Y is electrically connected to terminal 236b of interconnection 236 exposed from opening portion 216 of base 21, for example, by solder (illustration is omitted).

OIS piezoelectric element 32 is, for example, a plate-shaped element formed of a ceramic material, and generates a vibration by applying a high-frequency voltage. Two OIS piezoelectric elements 32 are disposed to be bonded to trunk portion 311 of OIS resonance portion 31 so as to hold trunk portion 311 therebetween.

Here, OIS piezoelectric elements 32 of first OIS driving part 30X are electrically connected to terminal 182b of interconnection 182 of first stage 13, for example, by an electrode member (illustration is omitted) (see FIG. 20 to be described later). Further, OIS piezoelectric elements 32 of second OIS driving part 30Y are electrically connected to terminal 235b of interconnection 235 exposed from opening portion 215 of base 21, for example, by an electrode member (illustration is omitted).

As described above, OIS piezoelectric elements 32 of first OIS driving part 30X are electrically connected to interconnection 181 and interconnection 182 of first stage 13 via energization portion 314 and the electrode member. Further, OIS piezoelectric elements 32 of second OIS driving part 30Y are electrically connected to interconnection 235 and interconnection 236 of base 21 via energization portion 314 and the electrode member. Accordingly, a voltage is applicable to OIS piezoelectric elements 32 of first OIS driving part 30X and second OIS driving part 30Y, and a vibration is generated at OIS piezoelectric elements 32 by applying a voltage.

OIS resonance portion 31 described above has at least two resonant frequencies and is deformed in behaviors different between the resonant frequencies. In other words, the entire shape of OIS resonance portion 31 is set such that OIS resonance portion 31 is deformed in behaviors different between the two resonant frequencies. The different behaviors include a behavior causing OIS power transmission part 34 to move forward in the X or Y direction, and a behavior causing OIS power transmission part 34 to move rearward in the X or Y direction. Accordingly, it is possible to cause OIS power transmission part 34 to move forward or rearward in the X or Y direction by vibrating OIS piezoelectric elements 32 at a desired resonant frequency.

OIS power transmission part 34 is a chucking guide extending in the X or Y direction, and one end thereof abuts on arm portions 312 of OIS resonance portion 31 and the other end thereof is connected to second stage 14. OIS power transmission part 34 includes OIS motor abutment portions 341, coupling portion 342, and stage fixing part 343.

OIS motor abutment portions 341 abut on free end portions of arm portions 312 of OIS resonance portion 31. Stage fixing part 343 is disposed at an end portion of OIS power transmission part 34 and is fixed to OIS chucking guide fixing part 145X or 145Y of second stage 14 (see FIG. 12). Coupling portion 342 is a portion that couples OIS motor abutment portions 341 and stage fixing part 343, and is formed to branch into two from stage fixing part 343.

The width between OIS motor abutment portions 341 is set wider than the width between the free end portions of arm portions 312 of OIS resonance portion 31. For example, it is possible to widen the width between OIS motor abutment portions 341 by interposing, between two branches of coupling portion 342 at a connecting portion between coupling portion 342 and stage fixing part 343, separating portion 344 that is larger than the width between connection end portions of the two branches of coupling portion 342. Separating portion 344 is, for example, integrally formed with stage fixing part 343.

By configuring the width between OIS motor abutment portions 341 to be wider than the width between the free end portions of arm portions 312, coupling portion 342 functions as a leaf spring and a biasing force acts on arm portions 312 in the direction of pushing out arm portions 312 when OIS power transmission part 34 is attached between arm portions 312. This biasing force allows OIS power transmission part 34 to be held between the free end portions of arm portions 312, and the driving force from OIS resonance portion 31 is efficiently transmitted to OIS power transmission part 34.

Note that, although attachment portions of coupling portion 342 are open on one side (the front side in the drawing) in stage fixing part 343 in the example illustrated in FIG. 11, stage fixing part 343 may have a structure such that stage fixing part 343 holds the attachment portions of coupling portion 342 on both sides (the depth side and the front side in the drawing). In this case, it is possible to prevent coupling portion 342 from being deviated over time to come off, and the reliability of OIS driving part 30 improves.

OIS resonance portion 31 and OIS power transmission part 34 abut on each other in a biased state. For this reason, it is possible to lengthen the movement stroke of OIS movable part 10 only by increasing the abutment portions in the X or Y direction without enlarging the external shape of optical element driving device 1.

Figure 12:
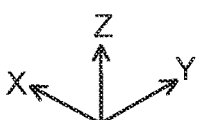
FIG. 12 is an exploded perspective view of an OIS movable part illustrated in FIG. 6.

First OIS driving part 30X is fixed to first stage 13 (on a side of OIS movable part 10) via OIS motor fixing part 134 (see FIG. 14), and is connected to second stage 14 via OIS power transmission part 34 (see FIG. 12). First OIS driving part 30X is driven in the X direction at the time of shake correction, and is driven such that first stage 13 (OIS movable part 10) moves in the X direction with respect to second stage 14. Note that, first OIS driving part 30X moves together with first stage 13 (OIS movable part 10) at the time of shake correction performed by second OIS driving part 30Y in the Y direction.

Further, second OIS driving part 30Y is fixed to base 21 (on a side of OIS fixing part 20) via OIS motor fixing part 219 (see FIG. 7), and is connected to second stage 14 via OIS power transmission part 34 (see FIG. 6). Second OIS driving part 30Y is driven in the Y direction at the time of shake correction, and is driven such that second stage 14 moves in the Y direction with respect to base 21 (OIS fixing part 20). As described above, second OIS driving part 30Y moves second stage 14 in the Y direction with respect to base 21 (OIS fixing part 20), and is therefore not affected by shake correction performed by first OIS driving part 30X in the X direction.

That is, the movement by one of OIS driving parts 30 is not hindered by the structure of the other one of OIS driving parts 30. Accordingly, it is possible to prevent rotation of OIS movable part 10 around the Z-axis, and it is possible to allow OIS movable part 10 to sway within the XY plane accurately.

OIS Biasing Member

OIS biasing members 50 are disposed in portions of the four corners (corner portions) of each of OIS movable part 10 and OIS fixing part 20 that have a rectangular shape. OIS biasing members 50 are formed of, for example, a tension coil spring, and couple OIS movable part 10 to OIS fixing part 20. End portions of OIS biasing members 50 on the image formation side in the optical axis direction are connected to terminals 231b to 234b of interconnections 231 to 234 exposed from opening portions 214 of base 21. End portions of OIS biasing members 50 on the light reception side in the optical axis direction are, on the other hand, connected to terminals 181a to 184a of interconnections 181 to 184 of first stage 13 (see FIG. 20).

OIS biasing members 50 receive a tensile load when OIS movable part 10 is coupled to OIS fixing part 20, and act on OIS movable part 10 and OIS fixing part 20 such that OIS movable part 10 and OIS fixing part 20 are close to each other. That is, OIS movable part 10 is held in a swayable manner within the XY plane by OIS biasing members 50 in a state of being biased to the image formation side in the optical axis direction (a state of being pressed against base 21). Thus, it is possible to hold OIS movable part 10 in a stable state without rattling.

Further, OIS biasing members 50 are made of a conductive material, and function as power supply lines (conductive paths) for AF driving part 15 and first OIS driving part 30X. Since OIS biasing members 50 function as power supply lines as described above, OIS biasing member 50 may swing, come into contact with another member, and cause a short circuit in a case where a huge impact is applied from outside. For this reason, wall portions 24 made of a non-conductive material are provided in positions corresponding to OIS biasing members 50 in OIS fixing part 20 so as to locally surround at least portions of the peripheries of OIS biasing members 50.

In the case of the present embodiment, the member that is made of a conductive material and is close to the positions of OIS biasing members 50 is cover 3. For this reason, wall portion 24 is disposed so as to be interposed between cover 3 and OIS biasing member 50. For example, wall portion 24 is disposed so as to surround, in the periphery of OIS biasing member 50, a portion on the outer side of OIS movable part 10 in the radial direction. Since wall portion 24 is interposed between cover 3 and OIS biasing member 50, wall portion 24 is capable of preventing OIS biasing member 50 from coming into contact with cover 3 (inner wall 303) even when OIS biasing member 50 swings in a case where a huge impact is applied from outside. As a result, it is possible to prevent occurrence of a short circuit.

Further, in first stage 13 and second stage 14, OIS biasing members 50 are disposed in notches 137 and 147 formed by cutting out four corners (corner portions) of each of first stage 13 and second stage 14 (see FIGS. 3 to 6). Since notches 137 and 147 are formed by cutting out the four corners of each of first stage 13 and second stage 14, it is possible to dispose wall portions 24 in the four corners of base 21 facing the four corners having been cut out.

More specifically, wall portions 24 are formed so as to face formation surfaces, in which notches 137 and 147 are formed, and so as not to extend to an extent that wall portions 24 face edge portions of first stage 13 and second stage 14 except for notches 137 and 147. Wall portions 24 are formed and disposed in the above-described manner, thereby making it possible to dispose wall portions 24 in the vicinity of OIS biasing members 50 disposed in notches 137 and 147. For this reason, it is not necessary to enlarge base 21, and it is possible to achieve a reduction in the size of optical element driving device 1 while suppressing an increase in the device size.

Further, wall portions 24 are formed together with notches 137 and 147 so as to surround the peripheries of OIS biasing members 50, and are formed, for example, in a substantially L-shape in plan view. The peripheries of OIS biasing members 50 are surrounded by wall portions 24 together with notches 137 and 147 as described above, thereby making it possible to prevent OIS biasing members 50 from coming into contact with other members even when OIS biasing members 50 swing in a case where a huge impact is applied from outside. Note that, wall portions 24 may extend from the corner portions of the four corners of base 21 in the X and Y directions so as not to interfere with the movement of OIS movable part 10.

OIS Movable Part

OIS movable part 10 will be described with reference to FIGS. 12 to 14. OIS movable part 10 is configured to be capable of holding lens part 2 and includes AF part 11, second stage 14, and the like as illustrated in FIGS. 12 to 14. Further, AF part 11 includes AF movable part 12, first stage 13, AF driving part 15, AF supporting part 16, and the like.

For the movement in the Y direction, OIS movable part 10 in its entirety, including first stage 13 and second stage 14, becomes a movable body (movable-side member). For the movement in the X direction, on the other hand, second stage 14 and OIS fixing part 20 function as a fixing body (fixing-side member), and only AF part 11 (AF movable part 12 and first stage 13) functions as a movable body (movable-side member). Further, first stage 13 functions as an AF fixing part that supports AF movable part 12.

AF Movable Part

Figure 15:
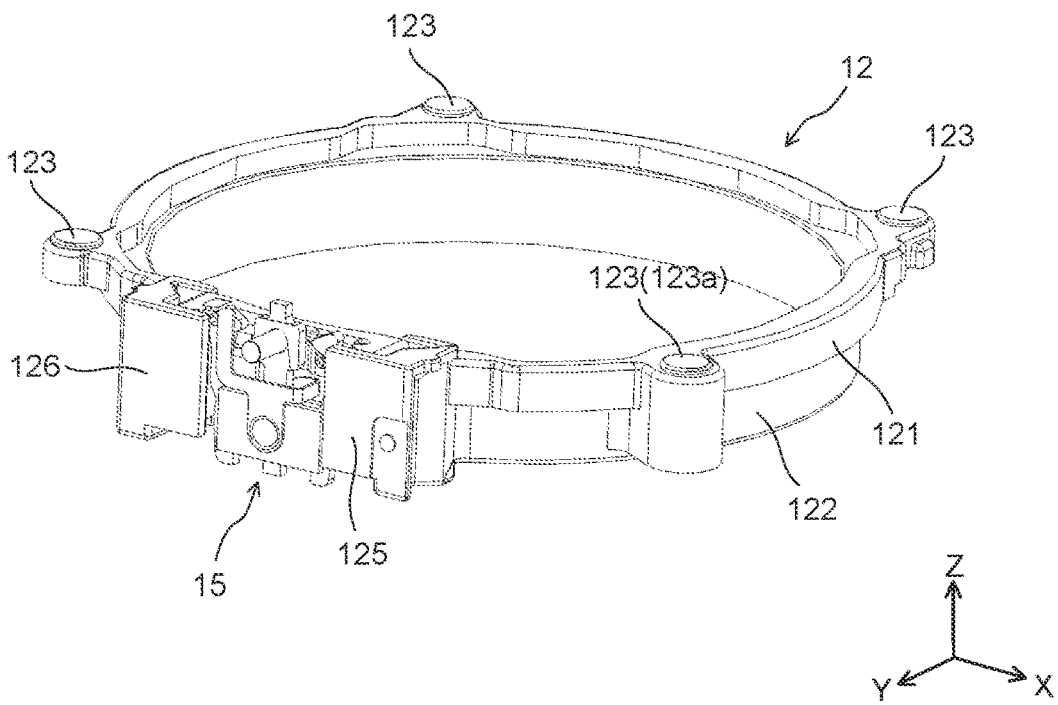
FIG. 15 is a perspective view of an AF movable part and an AF driving part which are illustrated in FIG. 13.
Figure 16:
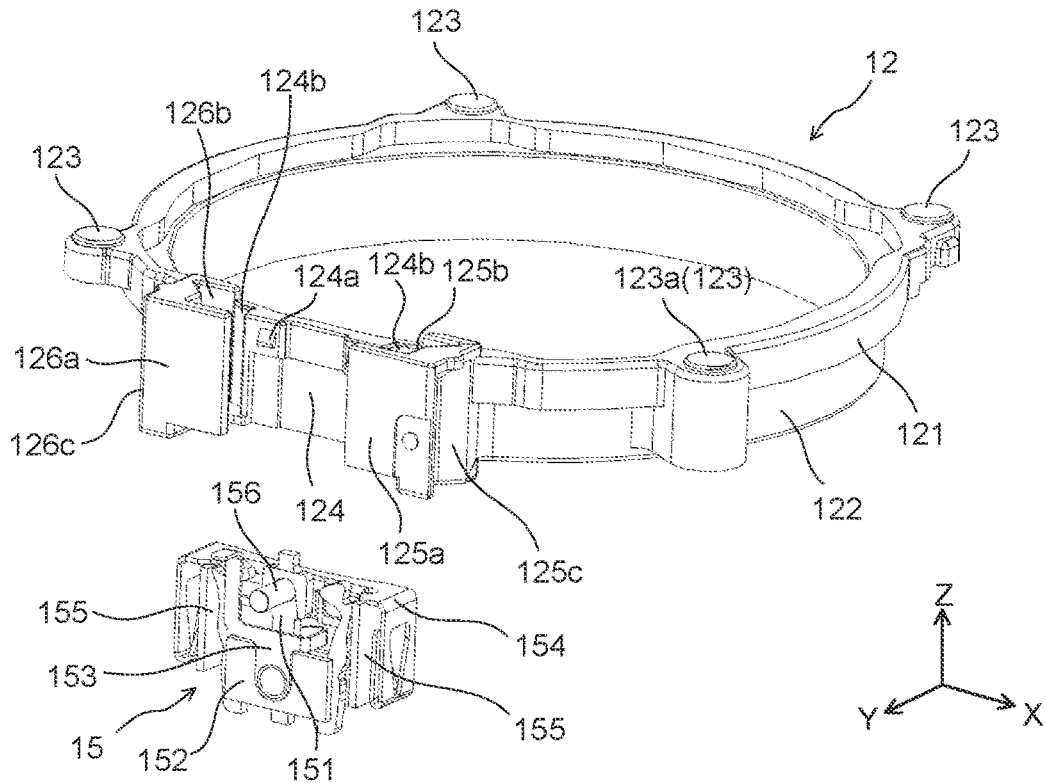
FIG. 16 is an exploded perspective view of the AF movable part illustrated in FIG. 15 from which the AF driving part is separated.
Figure 17:
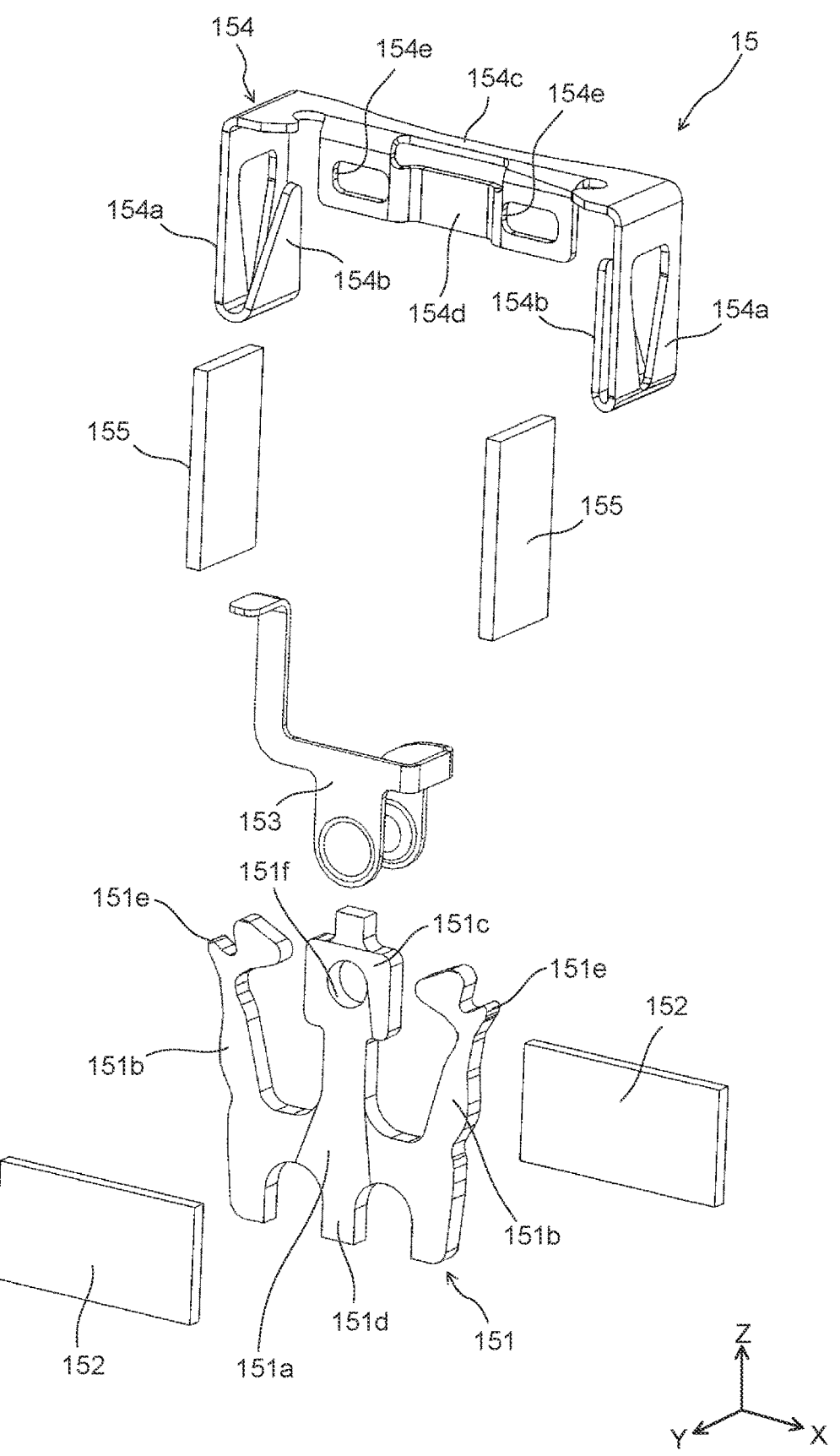
FIG. 17 is an exploded perspective view of the AF driving part illustrated in FIG. 16.

AF movable part 12 will be described with reference to FIGS. 15 to 18. FIG. 15 is a perspective view of AF movable part 12 and AF driving part 15. FIG. 16 is an exploded perspective view of AF movable part 12 from which AF driving part 15 is separated. FIG. 17 is an exploded perspective view of AF driving part 15. FIG. 18 illustrates AF movable part 12, first stage 13, and second stage 14 as viewed from an obliquely-downward side.

AF movable part 12 is a lens holder capable of holding lens part 2 (see FIG. 3), and moves in the optical axis direction at the time of focusing. AF movable part 12 is disposed away from first stage 13 (AF fixing part) on the inner side in the radial direction (on a side of lens part 2), and is supported by first stage 13 via AF supporting part 16 to be described later.

AF movable part 12 is formed of, for example, polyarylate (PAR), a PAR alloy that is a mixture of a plurality of resin materials including PAR, a liquid crystal polymer, or the like. AF movable part 12 includes lens housing part 121 having a cylindrical shape. Lens part 2 is fixed to an inner peripheral surface of lens housing part 121 by, for example, adhesion.

On the light reception side (upper side) of an outer peripheral surface of lens housing part 121 in the optical axis direction, AF movable part 12 includes flange part 122 that protrudes outward in the radial direction from the entire circumference of the outer peripheral surface. The image formation side (lower side) of flange part 122 in the optical axis direction abuts on flange receiving portion 131a of first stage 13 to be described later, thereby restricting the movement of AF movable part 12 to the image formation side in the optical axis direction. In the present embodiment, flange part 122 abuts on flange receiving portion 131a in a reference state in which AF driving part 15 is not driven.

Further, AF movable part 12 includes protrusion portions 123 that protrude outward in the radial direction from portions of the outer peripheral surface of flange part 122. Protrusion portions 123 are preferably disposed around the optical axis at equal intervals in plan view. In the present embodiment, four protrusion portions 123 are provided around the optical axis so as to be at equal intervals of 90°.

Note that, protrusion portion 123a that is one of four protrusion portions 123 extends on the image formation side in the optical axis direction, and magnet 17Z for Z position detection is provided inside the extended portion. As described above, magnet 17Z is disposed in a position facing magnetic sensor 221Z for Z position detection in sensor board 22 in the optical axis direction (see FIG. 6).

Protrusion portions 123 described above are inserted into guide grooves 132 of first stage 13 to be described later and move along guide grooves 132 when AF movable part 12 moves in the Z direction. Thus, guide grooves 132 function as a guiding mechanism for protrusion portions 123 in the Z direction.

In the present embodiment, as described above, a plurality of protrusion portions 123 and a plurality of guide grooves 132 are provided and guide grooves 132 function as a guiding mechanism for protrusion portions 123 in the Z direction. For this reason, when a portion of AF movable part 12 is about to float up largely (when AF movable part 12 is about to be inclined), protrusion portions 123 come into contact with guide grooves 132 to restrict AF movable part 12 such that AF movable part 12 is not inclined more than a given degree. As a result, even when a huge impact is applied from outside, first stage 13 (AF fixing part) prevents a part of AF movable part 12 from floating up largely, thereby making it possible to prevent AF movable part 12 from coming into contact with the inner wall (the inner wall on the light reception side in the optical axis direction) of cover 3.

Although the same effect as described above can be obtained for three protrusion portions 123 and three guide grooves 132 by adjusting the intervals between protrusion portions 123 and guide grooves 132 or the like, the foregoing effect is greater when four or more protrusion portions 123 and four or more guide grooves 132 are provided as in the present embodiment.

Further, in the present embodiment, protrusion portion 123 has a circular arc shape in plan view, and guide groove 132 also has a circular arc shape in plan view. In the case of such a circular arc shape, the area thereof in plan view is smaller than that of a rectangular shape with the same length in the circumferential direction and the same length in the radial direction, and it is possible to achieve space saving in terms of the disposition of protrusion portions 123 and guide grooves 132.

Further, AF movable part 12 includes driving part-housing part 124 that houses AF driving part 15 (see FIG. 16). Driving part-housing part 124 is provided on an outer peripheral surface of lens housing part 121. Further, AF movable part 12 includes a pair of plate housing portions 125 and 126 protruding outward in the radial direction from the outer peripheral surface of lens housing part 121 and extending in the optical axis direction so as to hold driving part-housing part 124 therebetween. The pair of plate housing portions 125 and 126 includes facing surfaces 125a and 126a disposed to face the outer peripheral surface of lens housing part 121, and facing surfaces 125a and 126a extend in a direction approaching each other in the X direction. That is, plate housing portions 125 and 126 have a substantially L-shape in plan view.

As will be described later in detail with reference to FIG. 17, AF power transmission part 154 that is an passive element of AF driving part 15 is disposed in driving part-housing part 124, and plates 155 of AF driving part 15 are disposed in plate housing portions 125 and 126. Further, driving part-housing part 124 and the pair of plate housing portions 125 and 126 are housed in AF motor fixing part 135 of first stage 13 to be described later and are movably supported in the Z direction by AF supporting part 16 (see FIGS. 13 and 14).

First Stage

Figure 13:
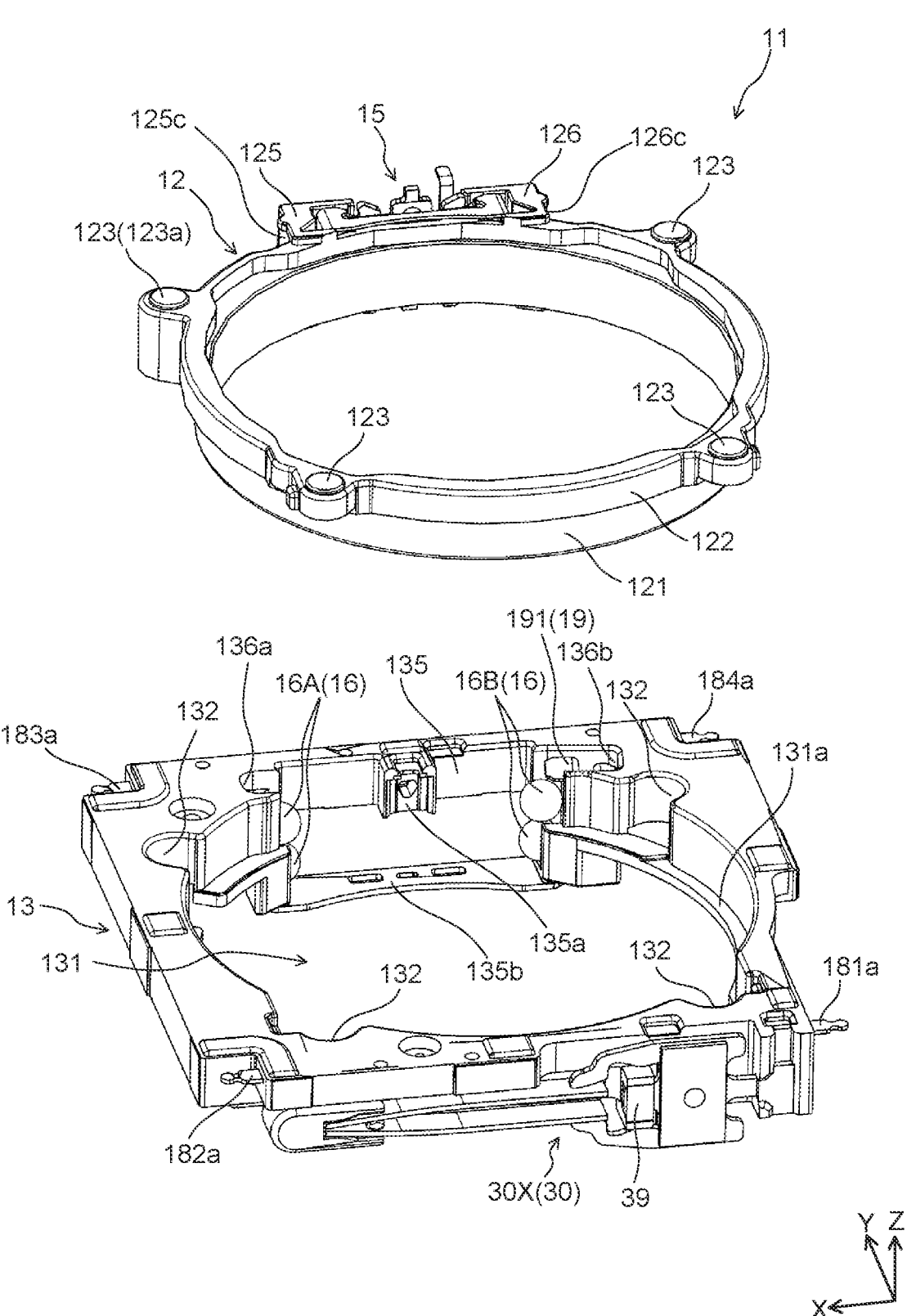
FIG. 13 is an exploded perspective view of an AF part illustrated in FIG. 12.

First stage 13 supports AF movable part 12 in a state of holding lens part 2 (see FIG. 3) via AF supporting part 16 (see FIG. 13). Second stage 14 is disposed in a position away from first stage 13 on the image formation side in the optical axis direction via X-direction reference balls 42, and first stage 13 is movably supported in the X direction by second stage 14 (see FIG. 12). Second stage 14 is movable only in the Y direction at the time of shake correction. First stage 13 itself is movable only in the X direction at the time of shake correction, but is also movable together with second stage 14 in the Y direction since first stage 13 is supported by second stage 14.

First stage 13 is a member having a substantially rectangular shape in plan view as viewed from the optical axis direction, and is formed of, for example, a liquid crystal polymer. First stage 13 includes opening 131 having a substantially circular shape in a portion corresponding to AF movable part 12 (see FIG. 13). In opening 131, flange receiving portion 131a corresponding to flange part 122 of AF movable part 12 is formed so as to protrude inward in the radial direction. Further, in opening 131, guide grooves 132 corresponding to protrusion portions 123 of AF movable part 12 are formed.

First stage 13 includes, in the lower surface, X-direction opening portions 133a and 133b for holding X-direction reference balls 42 that form OIS supporting part 40 (see FIG. 18). X-direction reference balls 42, which form OIS supporting part 40, and X-direction opening portions 133a and 133b will be described later with reference to FIGS. 19 and 20.

A portion of first stage 13 where first OIS driving part 30X is disposed (an outer surface of a side wall of first stage 13) is formed to be recessed inward in the radial direction such that first OIS driving part 30X can be disposed without protruding outward in the radial direction (OIS motor fixing part 134). Further, a portion of first stage 13 where second OIS driving part 30Y is disposed is also formed to be recessed inward in the radial direction in the same manner, and is here formed integrally with a portion obtained by cutting out a corner portion (notch 137a).

AF motor fixing part 135 in which AF driving part 15 is disposed and fixed is formed on the inner side of one of the side walls of first stage 13 which extend along the X direction. AF motor fixing part 135 includes: rivet attachment portion 135a including a through-hole for a rivet; and lower fixing plate 135b including an insertion hole for AF resonance portion 151 of AF driving part 15, to all of which AF resonance portion 151 of AF driving part 15 is attached.

Specifically, rivet 156 (see FIG. 16) is inserted though the through-hole of rivet attachment portion 135a (see FIG. 14) and through-hole 151f of energization portion 151c (see FIG. 17), and the leading end thereof is fastened with fastening tool 157 (see FIG. 18). Thus, AF resonance portion 151 is attached to rivet attachment portion 135a. Further, a lower end portion (on the image formation side in the optical axis direction) of AF resonance portion 151 is inserted into the insertion hole (whose reference sign is omitted) provided in lower fixing plate 135b and is fixed by adhesion, thereby attaching AF resonance portion 151 to lower fixing plate 135b. In this manner, AF driving part 15 is fixed to AF motor fixing part 135 of first stage 13 such that arm portions 151b extend in the Z direction.

Further, magnet 17X for X position detection is disposed in one of the side walls of first stage 13 which extend along the Y direction (see FIG. 18). For example, magnet 17X is magnetized in the X direction. As described above, magnetic sensor 221X for X position detection is disposed in sensor board 22 in a position facing magnet 17X in the optical axis direction (see FIG. 6).

Interconnections in First Stage

Figure 19:
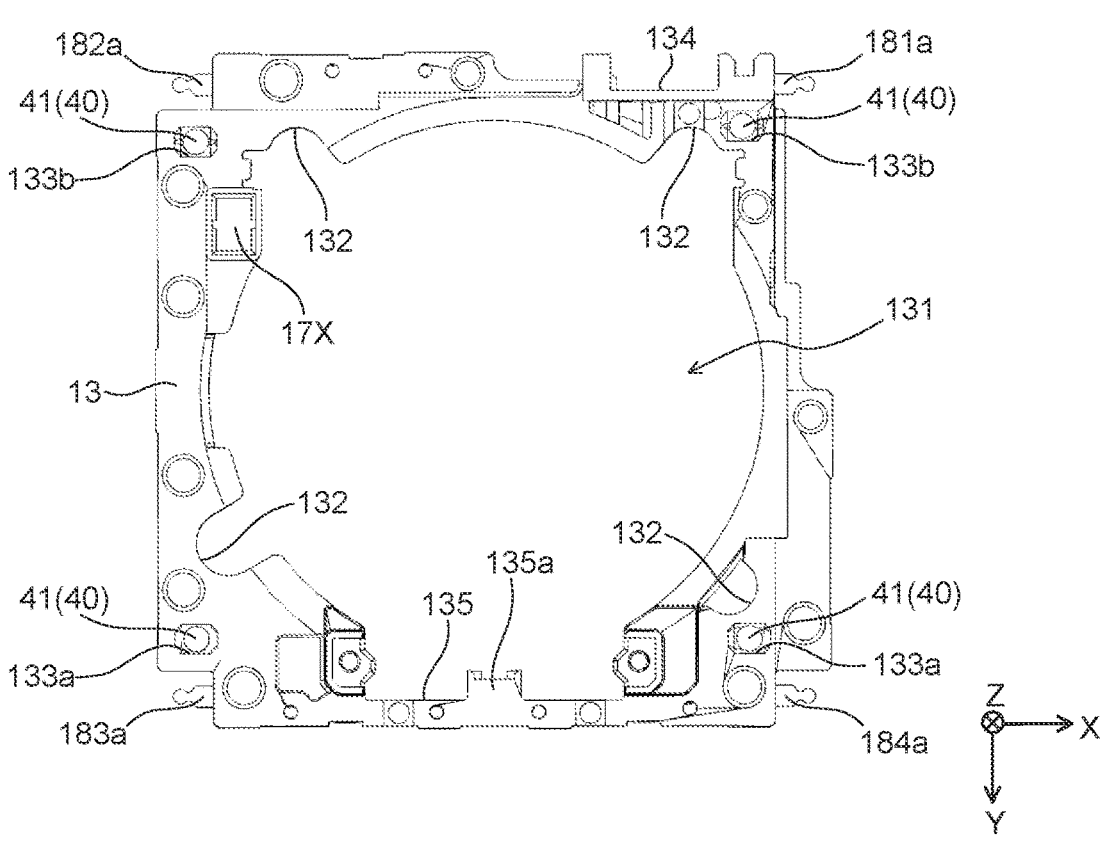
FIG. 19 is a bottom view of the first stage illustrated in FIG. 18.

FIG. 19 is a bottom view of first stage 13. FIG. 20 illustrates a positional relationship in first stage 13 among opening portions formed on a bottom surface of first stage 13 and interconnections 181 to 184 disposed inside first stage 13. In order to illustrate the positional relationship among first stage 13, X-direction opening portions 133a and 133b, and interconnections 181 to 184, FIG. 20 illustrates only the shapes thereof.

Interconnections 181 to 184 (the interconnection in the present invention) are embedded in first stage 13, for example, by insert molding. Interconnections 181 to 184 are disposed inside first stage 13, and are extended from the positions of terminals 181a to 184a of one end portions of interconnections 181 to 184 to the positions of terminals 181b to 184b of the other end portions thereof, respectively (see FIG. 20). Here, for example, in side portions of first stage 13 which extend along the X direction, interconnections 181 to 184 are disposed so as to be along the X direction.

Terminals 181a to 184a of interconnections 181 to 184 are exposed from notches 137 obtained by cutting out corner portions of the four corners of first stage 13, and one ends of OIS biasing members 50 are connected to terminals 181a to 184a. Further, terminals 181b to 184b are exposed from opening portions (illustration is omitted) formed on the side of the front surface (on the light reception side in the optical axis direction) of first stage 13.

Interconnections 181 and 182 are interconnections that serve as power supply lines for first OIS driving part 30X that moves first stage 13. Terminals 181b and 182b of interconnections 181 and 182 are electrically connected to first OIS driving part 30X, and power is supplied to first OIS driving part 30X via OIS biasing members 50 connected to terminals 181a and 182a.

Further, interconnections 183 and 184 are interconnections that serve as power supply lines for AF driving part 15 that moves AF movable part 12. Terminals 183b and 184b of interconnections 183 and 184 are electrically connected to AF driving part 15, and power is supplied to AF driving part 15 via OIS biasing members 50 connected to terminals 183a and 184a.

As described above, first stage 13 includes interconnections 181 to 184 serving as circuits for driving first OIS driving part 30X and AF driving part 15.

Interconnections 183 and 184 among interconnections 181 to 184 disposed within first stage 13 include extension portions 183c and 184c, respectively, that are extended so as to be exposed within X-direction opening portions 133a. Extension portions 183c and 184c are extended from portions of interconnections 183 and 184, where the portions are close to X-direction opening portions 133a. X-direction opening portions 133a in which interconnections 183 and 184 (extension portions 183c and 184c) are exposed may have the same configuration as Y-direction opening portions 218a described in FIG. 10.

Although it is configured here as an example such that portions (extension portions 183c and 184c) of interconnections are exposed within X-direction opening portions 133a, the present invention is not limited thereto, and it may be configured such that portions of interconnections are exposed within all X-direction opening portions 133a and 133b. For example, an arbitrary plurality of interconnections among interconnections 181 to 184 may be provided with extension portions similar to extension portions 183c and 184c described above, or the disposition of interconnections 181 to 184 may be adjusted.

Second Stage

Second stage 14 is a member having a substantially rectangular shape in plan view as viewed from the optical axis direction, and is formed of, for example, a liquid crystal polymer. Second stage 14 is disposed in the position away from first stage 13 on the image formation side in the optical axis direction via X-direction reference balls 42, movably supports first stage 13 in the X direction, and is movable together with first stage 13 in the Y direction.

Inner peripheral surface 141 of second stage 14 is formed corresponding to the external shape of AF movable part 12 (see FIG. 12). Portions of second stage 14 where first OIS driving part 30X and second OIS driving part 30Y are disposed (the outer surfaces of the side walls) are formed to be recessed inward in the radial direction as with first stage 13. A portion where second OIS driving part 30Y is disposed is formed integrally with a portion obtained by cutting out a corner portion (notch 147a).

Second stage 14 includes, in the upper surface, X-direction opening portions 143 for holding X-direction reference balls 42 that form OIS supporting part 40 (see FIG. 12). X-direction opening portions 143 may have the same configuration as X-direction opening portions 133b described above, which are disposed to face X-direction opening portions 143, and overlapping descriptions will therefore be omitted here.

Further, second stage 14 includes, in the lower surface, Y-direction opening portions 144 for holding Y-direction reference balls 41 that form OIS supporting part 40 (see FIG. 18). Y-direction opening portions 144 may have the same configuration as Y-direction opening portions 218b described above, which are disposed to face Y-direction opening portions 144, and overlapping descriptions will therefore be omitted here as well.

Further, magnet 17Y for Y position detection is disposed in one of the side walls of second stage 14 which extend along the Y direction (see FIG. 18). For example, magnet 17Y is magnetized in the Y direction. Magnetic sensor 221Y for Y position detection is disposed in sensor board 22 in a position facing magnet 17Y in the optical axis direction (see FIG. 6).

As described above, in the present embodiment, magnet 17X is disposed in first stage 13 that moves in the X direction, magnet 17Y is disposed in second stage 14 that moves in the Y direction, and magnet 17Z is disposed in AF movable part 12 that moves in the Z direction (see FIG. 18). In this manner, it is configured such that magnets 17X and 17Y are disposed in a dispersing manner among a plurality of members and are not disposed so to be concentrated on a specific one member. For this reason, it is not necessary to cut out portions of the side walls of a specific one member, for example, second stage 14 for ensuring spaces in which magnets 17X and 17Y are disposed, and the wall thickness of portions of the side walls of second stage 14 does not become thinner. As a result, even when a huge impact is applied from outside, second stage 14 or the like is not deformed, and it is possible to improve the durability of components.

Further, at the time of the movement only in the X direction, first stage 13 moves, but second stage 14 does not move, and magnet 17Y disposed in second stage 14 does not move, either. For this reason, the influence of magnet 17Y when position detection in the X direction by magnet 17X is performed is eliminated, and it is possible to improve the detection accuracy.

OIS Supporting Part-X Direction

Figure 20:
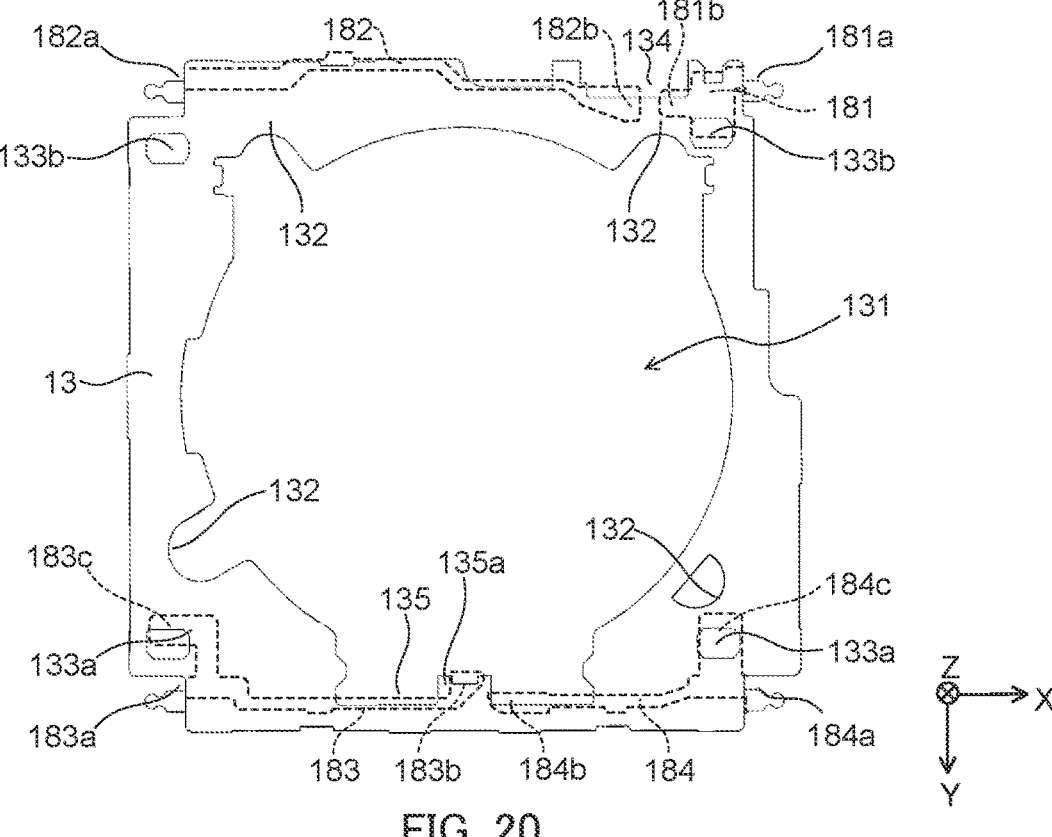
FIG. 20 illustrates a positional relationship in the first stage illustrated in FIG. 18 among opening portions formed on a bottom surface of the first stage and interconnections disposed inside the first stage.

First stage 13 includes, in the bottom surface, X-direction opening portions 133a and 133b (the housing part in the present invention) that house X-direction reference balls 42 that form OIS supporting part 40 (see FIGS. 19 and 20). X-direction reference balls 42 are held between X-direction opening portions 133a and 133b and X-direction opening portions 143 (the housing part in the present invention) of second stage 14, where X-direction opening portions 133a and 133b and X-direction opening portions 143 face each other in the Z direction (see FIGS. 12 and 18).

X-direction opening portions 133a and 133b and X-direction opening portions 143 are groove portions that include an opening having a rectangular shape extending in the X direction. X-direction opening portions 133a and 133b and X-direction opening portions 143 are formed such that the cross-sectional shape in the YZ plane is, for example, a square or an inverted triangle (V-shape). X-direction opening portions 133a and 133b and X-direction opening portions 143 may be configured such that the groove width tapers toward the bottom surface of the groove portion, in which case the cross-sectional shape in the YZ plane may be configured to be an inverted trapezoid or an inverted triangle (V-shape).

In the present embodiment, as with Y-direction opening portion 218a illustrated in FIG. 10, X-direction opening portion 133a is formed in an inverted trapezoidal cross-sectional shape, and extension portion 183c of interconnections 183 or extension portion 184c of interconnection 184 as described above is exposed so as to form a bottom portion of X-direction opening portion 133a. That is, at the bottom portion that is a portion of a housing part-forming surface (inner wall) that forms X-direction opening portion 133a, extension portion 183c or 184c is exposed so as to come into contact with X-direction reference ball 42 and receive a load in the optical axis direction. In this case, extension portion 183c or 184c exposed at the bottom portion of the housing part-forming surface that forms X-direction opening portion 133a has a planar shape orthogonal to the optical axis and abuts on X-direction reference ball 42 at one point.

X-direction reference ball 42 is disposed on the inner side of X-direction opening portion 133a whose bottom portion is formed of extension portion 183c or 184c, and comes into contact with extension portion 183c or 184c in the Z direction. Interconnections 181 to 184 are formed of conductive metal and are therefore generally harder than first stage 13 formed of a resin material or the like. For this reason, for example, even when optical element driving device 1 is subjected to a huge impact by a fall or the like, extension portion 183c or 184c is less likely to be deformed by a dent due to X-direction reference ball 42, or the like, and it is possible to suppress deformation of X-direction opening portion 133a.

Further, since extension portion 183c of interconnections 183 or extension portion 184c of interconnection 184, which is embedded in first stage 13, is utilized as a portion of the inner wall of X-direction opening portion 133a, it is possible to suppress deformation of X-direction opening portion 133a without newly adding a member that is hardly deformed.

Note that, in the present embodiment, X-direction opening portions 133b and 143 are formed such that the cross-sectional shape in the YZ plane is a V-shape. Here, X-direction opening portion 133b is not configured such that a portion of interconnections 181 to 184 is exposed, but may be configured such that a portion of interconnections 181 to 184 is exposed at, for example, at least one side surface of the V-shaped cross section of X-direction opening portion 133b. In this case, a portion or all of an interconnection, which is exposed at X-direction opening portion 133b, among interconnections 181 to 184, is embedded such that the surface thereof on the side of the bottom surface (on the image formation side in the optical axis direction) of first stage 13 is inclined with respect to the bottom surface of first stage 13. Further, the portion or all of the interconnection, which is exposed at X-direction opening portion 133b, among interconnections 181 to 184, is formed in a V-shaped cross-sectional shape and is embedded in first stage 13.

Further, here, second stage 14 includes no interconnection therein, and thus, X-direction opening portion 143 is not configured such that a portion of an interconnection is exposed. In a case where second stage 14 is configured to include an interconnection(s) therein, X-direction opening portion 143 may be configured such that a portion of an interconnection is exposed in the same manner as in X-direction opening portion 133b.

The grooves formed by X-direction opening portions 133a, 133b, and 143, respectively, are formed to be parallel to the X direction. For this reason, X-direction reference balls 42 held between X-direction opening portions 133a and 133b and X-direction opening portions 143 are rollable in the X direction within the grooves. That is, OIS movable part 10 (second stage 14) movably supports first stage 13 in the X direction via X-direction reference balls 42.

X-direction opening portions 133a and 133b and X-direction opening portions 143 are disposed in portions of the four corners of first stage 13 and second stage 14 both of which have a rectangular shape. First stage 13 is supported by second stage 14 at four X-direction reference balls 42, that is, at four points. As described above, X-direction reference balls 42 are held by multipoint contacts, and therefore stably roll in the X direction.

Note that, first stage 13 may be supported by second stage 14 at least at three or more points. For example, in a case where first stage 13 is supported by second stage 14 at three points, X-direction opening portions 133a and 133b and X-direction opening portions 143 may be disposed at a total of three locations of two locations on a side of one side of first stage 13 and second stage 14 and one location on a side of the side facing the one side thereof.

OIS supporting part 40 described above supports OIS movable part 10 in a swayable manner in the optical axis-orthogonal directions in a state in which OIS movable part 10 is away from OIS fixing part 20 in the optical axis direction. In the present embodiment, OIS supporting part 40 includes four Y-direction reference balls 41 interposed between OIS movable part 10 (second stage 14) and base 21

(see FIGS. 6 and 7). Further, OIS supporting part 40 includes four X-direction reference balls 42 interposed between first stage 13 and second stage 14 in OIS movable part 10 (see FIG. 12).

In the present embodiment, as described above, four Y-direction reference balls 41 are rollable in the Y direction, and directions in which four Y-direction reference balls 41 are rollable are restricted to the Y direction. Further, four X-direction reference balls 42 are rollable in the X direction, and directions in which four X-direction reference balls 42 are rollable are restricted to the X direction. As described above, restricting the directions in which Y-direction reference balls 41 and X-direction reference balls 42 are rollable allows OIS movable part 10 to sway within the XY plane accurately. Note that, the number of Y-direction reference balls and X-direction reference balls forming OIS supporting part 40 can be appropriately changed.

AF Driving Part

AF driving part 15 is an actuator that moves AF movable part 12 in the Z direction. As with OIS driving part 30, AF driving part 15 includes an ultrasonic motor that serves as a driving source for moving AF movable part 12. The configuration of AF driving part 15 will be described with reference to FIG. 17. FIG. 17 illustrates a state in which members of AF driving part 15 are disassembled.

As illustrated in FIG. 17, AF driving part 15 includes AF resonance portion 151, AF piezoelectric elements 152, AF electrode 153, AF power transmission part 154, and plates 155. The driving force of AF driving part 15 is transmitted to AF movable part 12 via AF power transmission part 154. That is, in AF driving part 15, AF resonance portion 151 forms an active element, and AF power transmission part 154 forms a passive element.

AF resonance portion 151 is formed of a conductive material and resonates with a vibration of AF piezoelectric elements 152 to convert the vibrational motion into a linear motion. AF resonance portion 151 is formed by, for example, laser processing, etching processing, press processing, or the like of a metal plate.

AF resonance portion 151 includes trunk portion 151a, two arm portions 151b, energization portion 151c, protrusion portion 151d, and the like.

In AF resonance portion 151, trunk portion 151a is a portion held between AF piezoelectric elements 152.

Two arm portions 151b extend in the Z direction from both side portions of trunk portion 151a. Two arm portions 151b have symmetrical shapes, and are disposed such that respective free end portions 151e of two arm portions 151b are held by AF power transmission part 154 via plates 155. Two arm portions 151b are symmetrically deformed in resonance with the vibration of AF piezoelectric elements 152.

Energization portion 151c extends in the Z direction from the central portion of trunk portion 151a and is electrically connected to terminal 183b of interconnection 183 of first stage 13, which is a power supply line. Further, through-hole 151f through which rivet 156 is inserted is formed in energization portion 151c.

Here, in AF motor fixing part 135 of first stage 13, rivet attachment portion 135a including a through-hole through which rivet 156 is inserted is formed (see FIGS. 13 and 14). Rivet 156 is inserted through through-hole 151f of energization portion 151c and the through-hole of rivet attachment portion 135a from the outer side toward the inner side of optical element driving device body 4 and the leading end thereof is fastened with fastening tool 157 (see FIG. 18). AF resonance portion 151 of AF driving part 15 is fixed to AF motor fixing part 135 (on a side of first stage 13) by rivet 156 and fastening tool 157.

As described above, the use of rivet 156 and fastening tool 157 makes it possible to firmly fix AF resonance portion 151 of AF driving part 15 to AF motor fixing part 135. For this reason, even when a huge impact is applied from outside, AF resonance portion 151 is not detached or deviated from AF motor fixing part 135, and it is possible to increase the reliability of AF driving part 15.

Note that, here, AF resonance portion 151 of AF driving part 15 is fixed to AF motor fixing part 135 by using rivet 156 and fastening tool 157, but may be fixed thereto by using other members, for example, a fixing material such as a resin-based adhesive.

Protrusion portion 151d extends from the central portion of trunk portion 151a on a side opposite to energization portion 151c. Protrusion portion 151d is inserted into the insertion hole (whose reference sign is omitted) provided in lower fixing plate 135b and is fixed by, for example, adhesion.

AF piezoelectric element 152 is, for example, a plate-shaped element formed of a ceramic material, and generates a vibration by applying a high-frequency voltage. Two AF piezoelectric elements 152 are disposed to be bonded to trunk portion 151a of AF resonance portion 151 so as to hold trunk portion 151a therebetween.

AF electrode 153 is disposed so as to hold two AF piezoelectric elements 152 that hold trunk portion 151a of AF resonance portion 151 therebetween.

As described above, two AF piezoelectric elements 152 are bonded to trunk portion 151a of AF resonance portion 151 and are held by AF electrode 153, and thus, those described above are electrically connected to each other. When energization portion 151c of AF resonance portion 151 is connected to terminal 183b of interconnection 183 of first stage 13 and AF electrode 153 is connected to terminal 184b of interconnection 184 of first stage 13, a voltage is applied to AF piezoelectric elements 152 and a vibration is generated.

As with OIS resonance portion 31, AF resonance portion 151 has at least two resonant frequencies and is deformed in behaviors different between the resonant frequencies. In other words, the entire shape of AF resonance portion 151 is set such that AF resonance portion 151 is deformed in behaviors different between the two resonant frequencies. The different behaviors include a behavior causing AF power transmission part 154 to move forward in the Z direction, and a behavior causing AF power transmission part 154 to move rearward in the Z direction. Accordingly, it is possible to cause AF power transmission part 154 to move forward or rearward in the Z direction by vibrating AF resonance portion 151 at a desired resonant frequency.

AF power transmission part 154 is a chucking guide having a predetermined length in the Z direction. AF power transmission part 154 is a member that biases plates 155 toward arm portions 151b of AF resonance portion 151. The structure of AF power transmission part 154 can be changed as appropriate, and here, as an example, AF power transmission part 154 includes a pair of side wall portions 154a, a pair of leaf spring portions 154b, coupling portion 154c, attachment portion 154d, a pair of attachment holes 154e, and the like.

The pair of side wall portions 154a faces each other in the X direction, and each thereof extends on the −side in the Y direction as well as extends on the lower side (the −side) in the Z direction. The pair of leaf spring portions 154*b* is formed to be inclined with respect to the Z direction such that lower-side end portions of side wall portions 154*a* in the Z direction are folded inward in a hairpin shape and plates 155 are pressed inward against arm portions 151*b* with the same biasing forces. Coupling portion 154*c* extends in the X direction and couples the pair of side wall portions 154*a* at upper-side end portions of the pair of side wall portions 154*a* in the Z direction. Attachment portion 154*d* extends from coupling portion 154*c* to the lower side in the Z direction along the outer peripheral surface of lens housing part 121. Attachment holes 154*e* are holes that are provided in attachment portion 154*d* and pass through attachment portion 154*d* in the Y direction.

Arm portions 151*b* of AF resonance portion 151 abut on leaf spring portions 154*b* via plates 155 so as to push out leaf spring portions 154*b*, and the driving force of AF driving part 15 is transmitted to AF movable part 12. When two arm portions 151*b* abut on leaf spring portions 154*b* of AF power transmission part 154, leaf spring portions 154*b* of AF power transmission part 154 function as leaf springs, and thus, the driving force generated by deformation of AF resonance portion 151 is efficiently transmitted. Since leaf spring portions 154*b* of AF power transmission part 154 cause biasing forces to act in directions of pushing back arm portions 151*b* of AF driving part 15, the driving force generated by the deformation of AF resonance portion 151 is more efficiently transmitted to AF power transmission part 154.

In the present embodiment, AF power transmission part 154 is formed of a member separate from AF movable part 12. AF power transmission part 154, for example, has a substantially U-shape in plan view, and attachment portion 154*d* thereof is fixed to the outer peripheral surface of lens housing part 121 in a state in which side wall portions 154*a* face each other in the X direction. Specifically, projection portion 124*a* provided in driving part-housing part 124 is inserted into attachment hole 154*e* of attachment portion 154*d*, and side wall portions 154*a* are disposed in recessed portions 125*b* and 126*b* of plate housing portions 125 and 126. Thus, AF power transmission part 154 is fixed to the outer peripheral surface of lens housing part 121, that is, to AF movable part 12.

AF power transmission part 154 is formed of a metal material such as, for example, titanium copper, nickel copper, and stainless steel. Note that, AF power transmission part 154 may be integrally formed with AF movable part 12.

Plate 155 is disposed so as to be interposed between arm portion 151*b* of AF resonance portion 151 and leaf spring portion 154*b* of AF power transmission part 154. The driving force from AF resonance portion 151 is transmitted to AF power transmission part 154 (on a side of AF movable part 12) via two plates 155. That is, two plates 155 function, together with AF power transmission part 154, as a passive element of AF driving part 15.

Plate 155 is, for example, a hard plate-shaped member made of a metal material such as titanium copper, nickel copper, and stainless steel. Plates 155 are disposed in driving part-housing part 124 of AF movable part 12 along the moving direction (the Z direction) such that the main surfaces of plates 155 abut on arm portions 151*b* of AF resonance portion 151, and are movable integrally with AF movable part 12.

Plate 155 is not bonded to other members and is housed in plate housing portion 125 or 126 of AF movable part 12. Specifically, in the Z direction, plate 155 is disposed and housed between a bottom portion (illustration is omitted) of plate housing portion 125 or 126 and coupling portion 154*c* of AF power transmission part 154. In the Y direction, plate 155 is disposed and housed between a guide groove (illustration is omitted) formed on a Y-direction inner side (the depth side in FIG. 16) of facing surface 125*a* or 126*a* and notch 124*b* formed at driving part-housing part 124 in the outer peripheral surface of lens housing part 121. In this manner, plates 155 are physically locked in the Z and Y directions within plate housing portions 125 and 126 in which plates 155 are housed.

In the X direction, on the other hand, plates 155 are movably disposed within plate housing portions 125 and 126, in which plates 155 are housed, so as to be capable of following a vibration or displacement of abutment portions (free end portions 151*e*) of leaf spring portions 154*b*, where the abutment portions abut on plates 155.

As described above, AF driving part 15 includes: AF piezoelectric elements 152 that generate a vibration under application of a voltage; and two arm portions 151*b* that are deformed in resonance with the vibration of AF piezoelectric element 152, and two arm portions 151*b* convert the vibration of AF piezoelectric elements 152 into a linear motion. In AF driving part 15, AF resonance portion 151 including two arm portions 151*b* functions as an active element.

Further, AF driving part 15 includes two plates 155 that are disposed in driving part-housing part 124 along the moving direction (the Z direction), abut on two arm portions 151*b*, and move relatively to AF resonance portion 151 in response to the driving force of arm portions 151*b*. In AF driving part 15, two plates 155 function as a passive element.

Further, AF driving part 15 includes two leaf spring portions 154*b* that bias two plates 155 toward two arm portions 151*b*. In AF driving part 15, AF power transmission part 154 including two leaf spring portions 154*b* functions as a biasing member.

Leaf spring portions 154*b* of AF power transmission part 154 impart biasing forces to arm portions 151*b* via plates 155. For this reason, even when AF movable part 12 moves in the optical axis direction, that is, even when the positions of arm portions 151*b* that abut on plates 155 move, a biased state (biasing loads) between arm portions 151*b* of AF resonance portion 151 as the active element and plates 155 as the passive element does not change. Accordingly, the driving force from AF resonance portion 151 can be stably transmitted to AF power transmission part 154 (on the side of AF movable part 12) via plates 155.

Further, the power transmission path from AF resonance portion 151 to AF movable part 12 is relatively short, and thus, the efficiency of power transmission from AF resonance portion 151 to AF movable part 12 can be improved.

When AF power transmission part 154, which includes leaf spring portions 154*b*, and plates 155 are formed of separate members, it is possible to use materials suitable for each. For example, for plates 155, it is possible to use a material having high rigidity, in which case the driving force of arm portions 151*b* of AF driving part 15 can be efficiently transmitted to AF power transmission part 154 (on the side of AF movable part 12).

Further, plates 155 have a flat surface, and thus, an arbitrary surface treatment can be performed appropriately. For example, in a case where a coating layer of diamond-like carbon (DLC), ceramic, or the like is formed on the surface, the abrasion resistance remarkably improves.

Further, AF resonance portion 151 (active element) and two plates 155 (passive element) are held between two leaf spring portions 154*b* of AF power transmission part 154. As a result, AF resonance portion 151 and two plates 155 are held in a state in which the biasing forces of two leaf spring portions 154*b* are balanced, and thus, uniform biasing forces can be easily caused to act on two plates 155.

Note that, the structure of AF driving part 15 described above can also be applied to OIS driving part 30. For example, by applying a combination of AF power transmission part 154 and plates 155 instead of OIS power transmission part 34 of OIS driving part 30, it is possible to easily cope with a long stroke, and the stability of the operation improves.

AF Supporting Part

As illustrated in FIGS. 13 and 14, first stage 13 includes first z-direction holding portion 136*a* and second z-direction holding portion 136*b* that hold first Z-direction reference balls 16A and second Z-direction reference balls 16B, where first Z-direction reference balls 16A and second Z-direction reference balls 16B form AF supporting part 16.

As described above, AF motor fixing part 135 that houses driving part-housing part 124 of AF movable part 12 and a pair of plate housing portions 125 and 126 is formed in first stage 13. First z-direction holding portion 136*a* and second z-direction holding portion 136*b* are formed in both end portions of AF motor fixing part 135 in the X direction.

First z-direction holding portion 136*a* is a groove formed toward the + side in the X direction, and is formed to have a substantially V-shaped (tapered) cross-sectional shape along the optical axis-orthogonal plane (XY plane) such that the groove width tapers toward the groove bottom (see FIGS. 5, 13, and 14). In first z-direction holding portion 136*a*, first Z-direction reference balls 16A are disposed.

Further, second z-direction holding portion 136*b* is a groove formed, inclined with respect to the X direction, toward the –side in the X direction, and is formed to have a substantially U-shaped cross-sectional shape along the optical axis-orthogonal plane (see FIGS. 5, 13, and 14). In second z-direction holding portion 136*b*, second Z-direction reference balls 16B as well as biasing part 19 for biasing AF movable part 12 via second Z-direction reference balls 16B are disposed.

As described above, AF movable part 12 includes plate housing portions 125 and 126. First z-direction holding portion 125*c* that holds first Z-direction reference balls 16A is formed on the + side of plate housing portion 125 in the X direction (see FIG. 16). First z-direction holding portion 125*c* is a groove formed toward the –side in the X direction, and is formed to have a substantially V-shaped (tapered) cross-sectional shape along the optical axis-orthogonal plane (XY plane) such that the groove width tapers toward the groove bottom.

In the same manner, second z-direction holding portion 126*c* that holds second Z-direction reference balls 16B is formed on the –side of plate housing portion 126 in the X direction (see FIG. 16). Second z-direction holding portion 126*c* is a groove formed toward the + side in the X direction, and is formed to have a substantially V-shaped (tapered) cross-sectional shape along the optical axis-orthogonal plane (XY plane) such that the groove width tapers toward the groove bottom.

Figure 21:
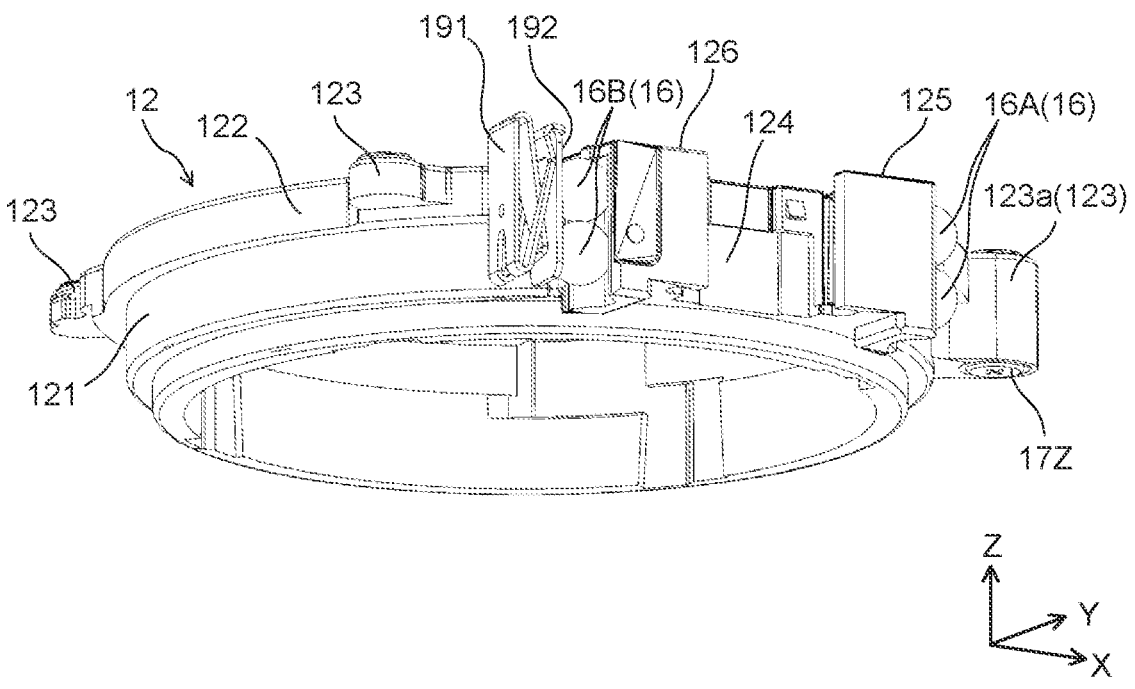
FIG. 21 is a perspective view of a biasing part that biases the AF movable part.
Figure 22:
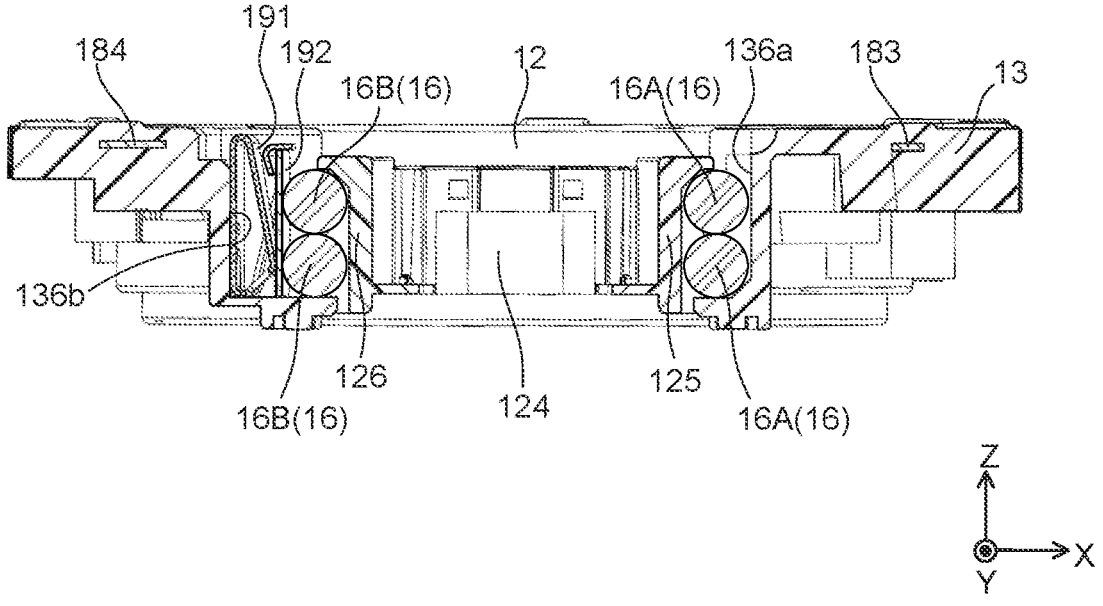
FIG. 22 is a cross-sectional view provided for describing the biasing part disposed between the first stage and the AF movable part.
Figure 23:
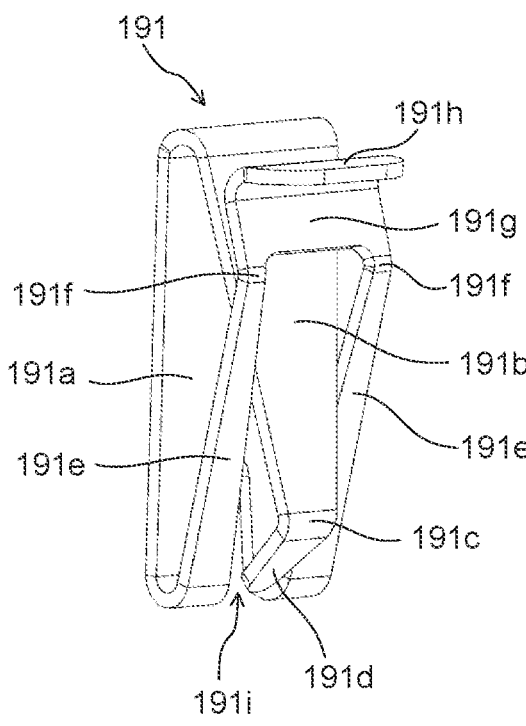
FIG. 23 is a perspective view of a leaf spring of the biasing part.

Here, biasing part 19 will be described with reference to FIGS. 21 to 23. FIG. 21 is a perspective view of biasing part 19 that biases AF movable part 12. FIG. 22 is a cross-sectional view provided for describing biasing part 19 disposed between first stage 13 and AF movable part 12. FIG. 23 is a perspective view of leaf spring 191 of biasing part 19.

Biasing part 19 includes, for example, leaf spring 191, which is a biasing member formed of a metal material, and spacer 192, which is formed of a ceramic material having a small coefficient of friction. Leaf spring 191 is disposed on a side of first stage 13, and spacer 192 is disposed on a side of AF movable part 12.

Leaf spring 191 is configured to abut on spacer 192 at a plurality of locations in the Z direction. Specifically, as illustrated in FIG. 23, leaf spring 191 includes foundation portion 191*a*, first elastic deformation portion 191*b*, first abutment portion 191*c*, first bent portion 191*d*, second elastic deformation portions 191*e*, second abutment portions 191*f*, second bent portion 191*g*, and restriction portion 191*h*. Leaf spring 191 illustrated in FIG. 23 can be formed by, for example, performing punching processing or bending processing on one sheet metal.

Foundation portion 191*a* is a rectangular plate-shaped member in contact with the inner wall of second z-direction holding portion 136*b* and supports first elastic deformation portion 191*b* and second elastic deformation portions 191*e* in an elastically deformable manner. First elastic deformation portion 191*b* is a portion that is elastically deformed with respect to foundation portion 191*a*, and is a trapezoidal plate-shaped member formed by bending so as to extend from a side of the upper end of foundation portion 191*a* to the – side in the Z direction and the + side in the X direction. First elastic deformation portion 191*b* is disposed so as to be inserted through opening portion 191*i* formed by two second elastic deformation portions 191*e*.

First abutment portion 191*c* is a portion that abuts on spacer 192 on a side of the lower end of first elastic deformation portion 191*b*, that is, on the – side thereof in the Z direction. First bent portion 191*d* is a triangular plate-shaped member formed by bending from a side of the lower end of first elastic deformation portion 191*b* to the – side in the Z direction and the – side in the X direction. By forming first bent portion 191*d*, first abutment portion 191*c* protrudes on the + side in the X direction to abut on spacer 192.

Second elastic deformation portions 191*e* are portions that are elastically deformed with respect to foundation portion 191*a*, and are two trapezoidal plate-shaped members formed by bending so as to extend from a side of the lower end of foundation portion 191*a* to the + side in the Z direction and on the + side in the X direction. The portion surrounded by two second elastic deformation portions 191*e* and second bent portion 191*g* is opening portion 191*i*.

Second abutment portions 191*f* are portions that abut on spacer 192 on sides of the upper ends of two second elastic deformation portions 191*e*, that is, on the + side thereof in the Z direction. Second bent portion 191*g* is a rectangular plate-shaped member formed by bending from sides of the upper ends of two second elastic deformation portions 191*e* to the + side in the Z direction and the –side in the X direction so as to connect two second elastic deformation portions 191*e* with each other. By forming second bent portion 191*g*, second abutment portions 191*f* protrude on the + side in the X direction to abut on spacer 192.

Restriction portion 191*h* is a rectangular plate-shaped member formed by bending from a side of the upper end of second bent portion 191*g* to the + side in the X direction. Restriction portion 191*h* restricts movement to the upper side of spacer 192 (the + side thereof in the Z direction) to cause first abutment portion 191*c* and second abutment portions 191*f* to abut on spacer 192 stably.

As described above, leaf spring 191 includes first abutment portion 191*c* and second abutment portions 191*f*, all of which abut on spacer 192 at a plurality of locations in the Z direction. For this reason, the biasing force of leaf spring 191 with respect to spacer 192 (on a side of AF movable part 12) does not change whatever position AF movable part 12 moves to in the Z direction, and it is possible to impart a constant biasing force. As a result, a tilt of AF movable part 12 with respect to the Z direction can be suppressed.

Further, by interposing spacer 192 made of ceramic between leaf spring 191 and second Z-direction reference balls 16B, second Z-direction reference balls 16B can be rolled smoothly and the durability also improves. Note that, the material of spacer 192 is not limited to a ceramic material having a small coefficient of friction as long as spacer 192 allows second Z-direction reference balls 16B to roll smoothly, and may be a material having an appropriate coefficient of friction such as a copper alloy or stainless steel, for example.

Second z-direction holding portion 136b is formed to be inclined with respect to the X direction, and biasing part 19 that is housed in second z-direction holding portion 136b is inclined with respect to the X direction and biases second Z-direction reference balls 16B. Thus, AF movable part 12 is pressed in the X and Y directions, which are two directions orthogonal to each other, via second Z-direction reference balls 16B, and is held in a stable attitude within the optical axis-orthogonal plane.

Inclination angle θ of second z-direction holding portion 136b with respect to the X direction and preload F of leaf spring 191 are set such that the rotation of AF movable part 12 around the optical axis is restricted. Inclination angle θ is, for example, 0° to 45° (excluding) 0°), and when inclination angle θ is increased, preload F can be reduced, whereas when preload F is increased, inclination angle θ can be reduced.

First Z-direction reference balls 16A are rollably held between first z-direction holding portion 125c of plate housing portion 125 of AF movable part 12 and first z-direction holding portion 136a of first stage 13. Further, second Z-direction reference balls 16B are rollably held between second z-direction holding portion 126c of plate housing portion 126 of AF movable part 12 and spacer 192 disposed in second z-direction holding portion 136b of first stage 13.

AF movable part 12 is supported and held in a stable attitude by first stage 13 in a state of being biased via first Z-direction reference balls 16A and second Z-direction reference balls 16B. Second Z-direction reference balls 16B also function as preloaded balls.

First Z-direction reference balls 16A are held between AF movable part 12 and first stage 13, and the movement in the optical axis-orthogonal directions (the rotation of AF movable part 12) is restricted. Thus, it is possible to move AF movable part 12 in the optical axis direction in a stable behavior.

Second Z-direction reference balls 16B, on the other hand, are held between AF movable part 12 and first stage 13 via leaf spring 191 and spacer 192, and the movement in the optical axis-orthogonal direction is allowed. Thus, it is possible to absorb the dimensional tolerances of AF movable part 12 and first stage 13, and the stability when AF movable part 12 moves improves.

Further, first Z-direction reference balls 16A are formed of two balls and second Z-direction reference balls 16B are formed of two balls. In a case where first Z-direction reference balls 16A are formed of two balls and second Z-direction reference balls 16B are formed of two balls, the diameter of the balls can be caused to be larger and the rolling resistance of the balls can be caused to be smaller than those in a case where first Z-direction reference balls 16A are formed of three or more balls and second Z-direction reference balls 16B are formed of three or more balls.

Here, it is configured such that plate housing portions 125 and 126 of AF movable part 12, which are portions where AF driving part 15 is disposed, are held between first Z-direction reference balls 16A and second Z-direction reference balls 16B, and that the preload is applied to second Z-direction reference balls 16B. That is, it is configured such that AF movable part 12 is supported at one location with respect to first stage 13.

Thus, it is easier to reduce the distance between the force point (the abutment point between AF resonance portion 151 and plate 155) at which the driving force of AF driving part 15 is received and the rotational axis (the center of first Z-direction reference ball 16A), and it is possible to reduce the moment to reduce the preload. Further, second Z-direction reference balls 16B function as preloaded balls and there are no other preloaded balls, and thus, it is possible to reduce the rolling resistance. Accordingly, the driving efficiency of AF driving part 15 improves, and it is suitable as a lens driving device for a large diameter lens as well. Further, when the preload is the same, the tilt resistance improves.

Operations of Optical Element Driving Device

In optical element driving device 1, when a voltage is applied to AF driving part 15, AF piezoelectric elements 152 vibrate, and AF resonance portion 151 is deformed in a behavior corresponding to the frequency. The driving force of AF driving part 15 causes AF power transmission part 154 to slide in the Z direction. Along with this, AF movable part 12 moves in the Z direction, and focusing is performed. Since AF supporting part 16 is formed of balls, AF movable part 12 can move smoothly in the Z direction. Further, AF driving part 15 and AF power transmission part 154 only abut on each other in a biased state, and thus, it is possible to lengthen the movement stroke of AF movable part 12 easily only by increasing the abutment portion in the Z direction without impairing a reduction in the height of optical element driving device 1.

Further, in optical element driving device 1, when a voltage is applied to OIS driving part 30, OIS piezoelectric elements 32 vibrate, and OIS resonance portion 31 is deformed in a behavior corresponding to the frequency. The driving force of OIS driving part 30 causes OIS power transmission part 34 to slide in the X or Y direction. Along with this, OIS movable part 10 moves in the X or Y direction, and shake correction is performed. Since OIS supporting part 40 is formed of balls, OIS movable part 10 can move smoothly in the X or Y direction.

Specifically, in a case where first OIS driving part 30X is driven and OIS power transmission part 34 moves in the X direction, power is transmitted from first stage 13, in which first OIS driving part 30X is disposed, to second stage 14. At this time, Y-direction reference balls 41 held between second stage 14 and base 21 cannot roll in the X direction, and thus, the position of second stage 14 with respect to base 21 in the X direction is maintained. X-direction reference balls 42 held between first stage 13 and second stage 14, on the other hand, can roll in the X direction, and thus, first stage 13 moves in the X direction with respect to second stage 14. That is, second stage 14 serves as the fixing body of the OIS function, and first stage 13 serves as the movable body of the OIS function.

Further, in a case where second OIS driving part 30Y is driven and OIS power transmission part 34 moves in the Y direction, power is transmitted from base 21, in which second OIS driving part 30Y is disposed, to second stage 14. At this time, X-direction reference balls 42 held between first stage 13 and second stage 14 cannot roll in the Y direction, and thus, the position of first stage 13 with respect to the second stage in the Y direction is maintained. Y-direction reference balls 41 held between second stage 14 and base 21, on the other hand, can roll in the Y direction, and thus, second stage 14 moves in the Y direction with respect to base 21. First stage 13 also moves in the Y direction following second stage 14. That is, base 21 serves as the fixing body of the OIS function, and AF part 11 including first stage 13 and second stage 14 serve as the movable body of the OIS function.

As described above, OIS movable part 10 sways within the XY plane, and shake correction is performed. Specifically, the energization voltage to first OIS driving part 30X and second OIS driving part 30Y is controlled based on a detection signal indicating an angular shake from a shake detection part (for example, a gyro sensor) such that the angular shake of camera module A is canceled. At this time, it is possible to accurately control the translational movement of OIS movable part 10 by feeding back the detection result of the XY position detecting part formed of magnets 17X and 17Y and magnetic sensors 221X and 221Y.

According to optical element driving device 1 of the present embodiment, OIS driving part 30 and AF driving part 15 are formed of an ultrasonic motor, and thus, it is possible to reduce an influence of external magnetism as well as to achieve a size reduction and a height reduction.

Even when camera modules A including optical element driving device 1 are disposed close to each other as in smartphone M, there is no magnetic influence. Thus, optical element driving device 1 is extremely suitable for use in a dual camera.

Further, arm portions 151b of AF driving part 15 extend in the optical axis direction and are held by AF power transmission part 154, and the driving force of AF driving part 15 is transmitted to AF movable part 12 to the maximum, and thus, the driving force for moving AF movable part 12 can be efficiently obtained. In addition, the rotational moment with respect to the supporting position is suppressed by bringing the position of AF driving part 15 and the position of AF supporting part 16 close to each other, and thus, the moving operation of AF movable part 12 is stabilized. Accordingly, the driving performance of optical element driving device 1 remarkably improves.

Other Embodiments

The present invention is not limited to the embodiment described above, and may be changed without departing from the gist thereof.

For example, although smartphone M has been described in the foregoing embodiment as an example, the present invention is applicable to a camera-mounted device including a camera module and an image processing part that processes image information obtained by the camera module. The camera-mounted device encompasses an information device and a transport device. Examples of the information device include a camera-mounted mobile phone, a notebook computer, a tablet terminal, a handheld game console, a webcam, and a camera-mounted in-vehicle device (for example, a rear-view monitor device and a dashboard camera device). Further, examples of the transport device include an automobile.

Figure 24A:
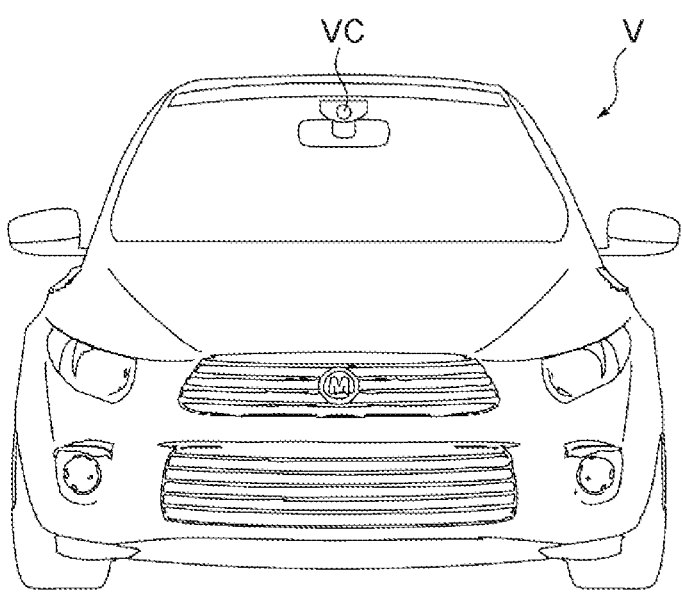
FIG. 24A is a front view of an automobile as a camera-mounted device in which an in-vehicle camera module is mounted.
Figure 24B:
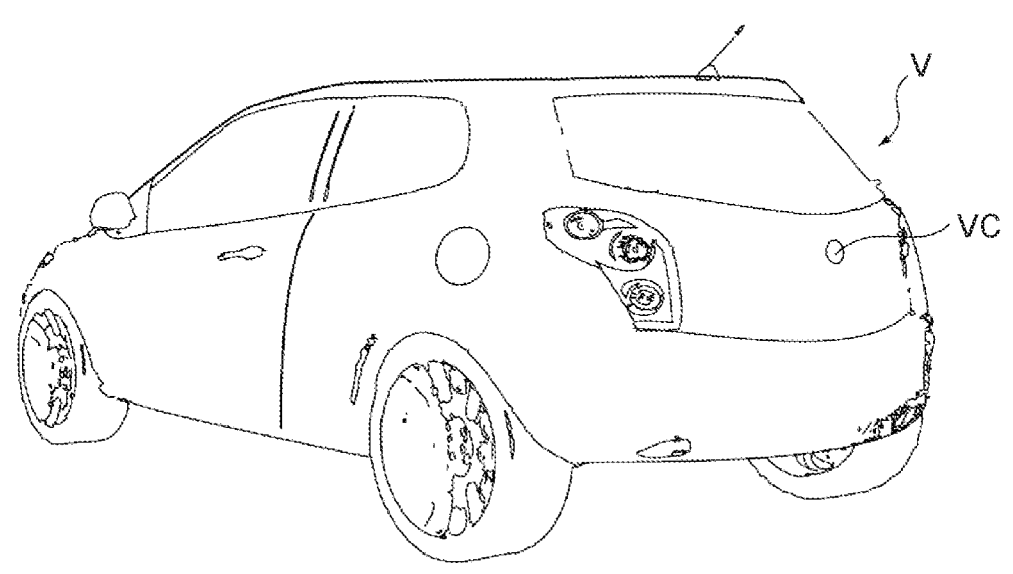
FIG. 24B is a perspective view of the automobile illustrated in FIG. 24A, as viewed from an obliquely-rearward side.

FIGS. 24A and 24B illustrate automobile V as a camera-mounted device in which in-vehicle camera module vehicle camera (VC) is mounted. FIG. 24A is a front view of automobile V, and FIG. 24B is a rear perspective view of automobile V. In automobile V, camera module A described in the foregoing embodiment is mounted as in-vehicle camera module VC. As illustrated in FIGS. 24A and 24B, in-vehicle camera module VC is attached to the windshield so as to face forward, and/or is attached to the rear gate so as to face rearward, for example. This in-vehicle camera module VC is used for a rear-view monitor, a dashboard camera, collision avoidance control, autonomous driving control, and the like.

Further, in the embodiment described above, the holding portions for holding first Z-direction reference balls 16A and second Z-direction reference balls 16B are provided in both AF movable part 12 and first stage 13. The present invention is not limited thereto, and the holding portions for holding first Z-direction reference balls 16A and second Z-direction reference balls 16B may be provided in either AF movable part 12 or first stage 13.

Further, in the embodiment described above, first Z-direction reference balls 16A and second Z-direction reference balls 16B are disposed symmetrically in the circumferential direction by using AF driving part 15 as a reference, but may be disposed asymmetrically. In this case, in order to stabilize the moving operation of AF movable part 12, it is preferable that first Z-direction reference balls 16A be on a side of AF driving part 15.

Further, in the embodiment described above, AF driving part 15 is disposed along the X direction, but the aspect of disposition of AF driving part 15 is not limited thereto. For example, AF driving part 15 may be disposed along the Y direction, or may be disposed to be inclined with respect to the X and Y directions.

Further, in the embodiment described above, optical element driving device 1 that drives lens part 2 as an optical element has been described, but the optical element to be driven may be an optical element other than a lens, such as a mirror and a prism.

Further, the present invention is applicable not only to auto-focusing but also to a case where a movable part is moved in the optical axis direction, such as zooming. In addition, AF driving part 15 and OIS driving part 30 are not limited to the case where the driving source is formed of an ultrasonic motor, but can also be applied to an optical element driving device including a driving source (for example, a voice coil motor (VCM)) other than an ultrasonic motor.

The embodiment disclosed herein is merely an exemplification in every respect and should not be considered as limitative. The scope of the present invention is specified not by the description provided above, but by the appended claims, and is intended to include all modifications in so far as they are within the scope of the appended claims or the equivalents thereof.

The disclosure of Japanese Patent Application No. 2021-167343, filed on Oct. 12, 2021, including the specification, drawings and abstract, is incorporated herein by reference in its entirety.

INDUSTRIAL APPLICABILITY

The optical element driving device and the camera module according to the present invention are useful by being mounted in a camera-mounted device such as a smartphone, a mobile phone, a digital camera, a notebook computer, a tablet terminal, a handheld game console, and a vehicle-mounted camera, for example.

REFERENCE SIGNS LIST

1 Optical element driving device
2 Lens part (an example of the optical element)
3 Cover
4 Optical element driving device body
5 Image-capturing part
10 OIS movable part (an example of the movable-side member)
11 AF part
12 AF movable part
13 First stage (an example of the first movable part)
14 Second stage (an example of the second movable part)
15 AF driving part
16 AF supporting part
16A First Z-direction reference ball
16B Second Z-direction reference ball
17X, 17Y, 17Z Magnet
19 Biasing part
20 OIS fixing part (an example of the fixing-side member and the fixing part)
21 Base
22 Sensor board
24 Wall portion
30 OIS driving part (an example of the driving part)
30X First OIS driving part
30Y Second OIS driving part
31 OIS resonance portion
32 OIS piezoelectric element
34 OIS power transmission part
39 Resin member
40 OIS supporting part (an example of the supporting part)
41 Y-direction reference ball (an example of the rolling member)
42 X-direction reference ball (an example of the rolling member)
50 OIS biasing member
121 Lens housing part
122 Flange part
123, 123a Protrusion portion
124 Driving part-housing part
124a Projection portion
124b Notch
125, 126 Plate housing portion
125a, 126a Facing surface
125b, 126b Recessed portion
125c First z-direction holding portion
126c Second z-direction holding portion
131 Opening
131a Flange receiving portion
132 Guide groove
133a, 133b X-direction opening portion (an example of the housing part)
134 OIS motor fixing part
134a Rivet attachment portion
135 AF motor fixing part
135a Rivet attachment portion
135b Lower fixing plate
136a First z-direction holding portion
136b Second z-direction holding portion
137, 137a Notch 141 Inner peripheral surface
143 X-direction opening portion (an example of the housing part)
144 Y-direction opening portion (an example of the housing part)
145X, 145Y OIS chucking guide fixing part
147, 147a Notch
151 AF Resonance portion
151a Trunk portion
151b Arm portion
151c Energization portion
151d Protrusion portion
151e Free end portion
151f Through-hole
152 AF piezoelectric element
153 AF electrode
154 AF power transmission part
154a Side wall portion
154b Leaf spring portion
154c Coupling portion
154d Attachment portion
154e Attachment hole
155 Plate
156 Rivet
157 Fastening tool
181 to 184 Interconnection (an example of the interconnection)
181a to 184a Terminal
181b to 184b Terminal
183c, 184c Extension portion
191 Leaf spring
191a Foundation portion
191b First elastic deformation portion
191c First abutment portion
191d Bent portion
191e Second elastic deformation portion
191f Second abutment portion
191g Bent portion
191h Restriction portion
191i Opening portion
192 Spacer
211 Opening
212 First base portion
213a, 213b Second base portion
214 to 217 Opening portion
218a, 218b Y-direction opening portion (an example of the housing part)
219 OIS motor fixing part
219a Rivet attachment portion
221X, 221Y, 221Z Magnetic sensor
231 to 237 Interconnection (an example of the interconnection)
231a to 237a Terminal
231b to 237b Terminal
232c, 233c Extension portion
301, 401 Opening
302 Opening surface
303 Inner wall
311 Trunk portion
312 Arm portion
313 Protrusion portion
313a Through-hole
314 Energization portion
341 OIS motor abutment portion
342 Coupling portion
343 Stage fixing part
344 Separating portion

501 Image sensor board
502 Image-capturing element
503 Control part
A Camera module
M Smartphone (an example of the camera-mounted device)

The invention claimed is:

1. An actuator, comprising:

a movable-side member configured to move by driving of a driving part;

a fixing-side member that is disposed in a position away from the movable-side member and movably supports the movable-side member via a rolling member; and a metal member that is embedded in at least one of the movable-side member and the fixing-side member and is formed of a metal harder than a resin material which forms at least one of the movable-side member and the fixing-side member, wherein:

the movable-side member and the fixing-side member include a housing part-forming surface that forms a housing part of the rolling member, and the metal member includes a wire portion and an extension portion, the wire portion being functioning as a wire electrically connected to the driving part and the extension portion being extended from the wire portion and exposed at a portion of the housing part-forming surface so as to come into contact with the rolling member.

2. The actuator according to claim 1, wherein the extension portion has a planar shape and abuts on the rolling member at one point.

3. The actuator according to claim 1, wherein the metal member is embedded in the fixing-side member.

4. The actuator according to claim 1, wherein the metal member is embedded in the movable-side member.

\* \* \* \* \*